(12) United States Patent
Sellers et al.

(10) Patent No.: US 7,410,529 B2
(45) Date of Patent: Aug. 12, 2008

(54) FILTER SERVICE SYSTEM AND METHOD

(75) Inventors: Cheryl Lynn Sellers, Peoria, IL (US); David Thaler, Mossville, IL (US); Mark T. Grimm, Dunlap, IL (US); Jeremy Trethewey, Dunlap, IL (US); Natalie Noel Vanderspiegel, Peoria, IL (US); Richard A. Crandell, Morton, IL (US); Dong Fei, Peoria, IL (US); Roger A. Hudson, Hanna City, IL (US); Mark Alan Gasper, Delavan, IL (US); Herbert DaCosta, Peoria, IL (US); Eric Charles Fluga, Dunlap, IL (US); Hemant Prasad Mallampalli, Peoria, IL (US); Bruce Frazier, Dunlap, IL (US); Matthew Fletcher, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 314 days.

(21) Appl. No.: 11/138,998

(22) Filed: May 27, 2005

(65) Prior Publication Data
US 2006/0070361 A1 Apr. 6, 2006

Related U.S. Application Data

(63) Continuation-in-part of application No. 10/958,226, filed on Oct. 5, 2004.

(51) Int. Cl.
*B01D 41/00* (2006.01)
(52) U.S. Cl. .............................. 95/279; 95/282; 95/283; 55/282.2; 55/291; 55/302; 55/303; 55/304

(58) Field of Classification Search .................. 95/278, 95/279, 282, 291, 293, 295, 300, 304, 523, 95/DIG. 30, 280, 282.2, 301, 302, 303, 283
See application file for complete search history.

(56) References Cited

U.S. PATENT DOCUMENTS 3,053,031 A 9/1962 Vedder et al.

(Continued)

FOREIGN PATENT DOCUMENTS

EP 0 230 140 A1 7/1987

(Continued)

OTHER PUBLICATIONS

International Application No. PCT/US2006/001850, Wagner et al., Apparatus For Combusting Collected Diesel Exhaust Material From Aftertreatment Devices And Methods, Jan. 18, 2006.*

(Continued)

*Primary Examiner*—Duane Smith
*Assistant Examiner*—Robert A Clemente
(74) *Attorney, Agent, or Firm*—Finnegan, Henderson, Farabow, Garrett & Dunner

(57) ABSTRACT

According to an exemplary embodiment of the present disclosure, a system for removing matter from a filtering device of a work machine includes a gas pressurization assembly. An element of the gas pressurization assembly is removably attachable to a first orifice of the filtering device without removing the filtering device from a work machine to which the filtering device is connected. The system also includes a heat source fluidly connected to the gas pressurization assembly.

43 Claims, 9 Drawing Sheets

U.S. PATENT DOCUMENTS

| | | |
|---|---|---|
| 3,887,341 A | 6/1975 | Sutter |
| 3,954,426 A | 5/1976 | Brange |
| 3,983,036 A | 9/1976 | Lauzeral et al. |
| 4,201,556 A | 5/1980 | Olsson |
| 4,509,340 A | 4/1985 | Mullally et al. |
| 4,514,642 A | 4/1985 | Ross |
| 4,516,990 A | 5/1985 | Erdmannsdörfer et al. |
| 4,525,183 A | 6/1985 | Cordes et al. |
| 4,527,393 A | 7/1985 | Young |
| 4,550,570 A | 11/1985 | Trage et al. |
| 4,580,401 A | 4/1986 | Ruscheweyh |
| 4,582,077 A | 4/1986 | Gabriel et al. |
| 4,690,207 A | 9/1987 | Trage et al. |
| 4,777,798 A | 10/1988 | Jacobson et al. |
| 4,833,833 A | 5/1989 | Rhodes |
| 4,833,883 A | 5/1989 | Oda et al. |
| 4,864,821 A | 9/1989 | Hoch |
| 4,866,932 A | 9/1989 | Morita et al. |
| 4,875,335 A | 10/1989 | Arai et al. |
| 4,875,336 A | 10/1989 | Hayashi et al. |
| 4,898,599 A | 2/1990 | Settlemyer |
| 4,909,037 A | 3/1990 | Hubby |
| 4,940,470 A | 7/1990 | Jaisinghani et al. |
| 5,019,142 A | 5/1991 | Waschkuttis |
| 5,039,347 A | 8/1991 | Hindstrom et al. |
| 5,039,425 A | 8/1991 | Caris et al. |
| 5,062,965 A | 11/1991 | Bernou et al. |
| 5,123,243 A | 6/1992 | Baddour |
| 5,129,920 A | 7/1992 | Albers et al. |
| 5,151,186 A | 9/1992 | Yoo et al. |
| 5,203,889 A | 4/1993 | Brown |
| 5,212,948 A | 5/1993 | Gillingham et al. |
| 5,253,476 A | 10/1993 | Levendis et al. |
| 5,254,114 A | 10/1993 | Reed, Jr. et al. |
| 5,254,144 A | 10/1993 | Provol |
| 5,350,442 A | 9/1994 | Thelen et al. |
| 5,390,492 A | 2/1995 | Levendis |
| 5,397,550 A | 3/1995 | Marino, Jr. |
| 5,426,936 A | 6/1995 | Levendis et al. |
| 5,444,892 A | 8/1995 | Ris et al. |
| 5,497,621 A | 3/1996 | Mallett |
| 5,560,209 A | 10/1996 | Kienbock et al. |
| 5,566,545 A | 10/1996 | Hijikata et al. |
| 5,591,338 A | 1/1997 | Pruette et al. |
| 5,592,925 A | 1/1997 | Machida et al. |
| 5,595,063 A | 1/1997 | Trage et al. |
| 5,616,171 A | 4/1997 | Barris et al. |
| 5,617,771 A | 4/1997 | Landrum |
| 5,634,952 A | 6/1997 | Kasai et al. |
| 5,669,365 A | 9/1997 | Gärtner et al. |
| 5,718,281 A | 2/1998 | Bartalone et al. |
| 5,725,621 A | 3/1998 | Pruette et al. |
| 5,738,706 A * | 4/1998 | Swanander et al. ............ 95/14 |
| 5,746,807 A | 5/1998 | Thelen et al. |
| 5,794,453 A | 8/1998 | Barnwell |
| 5,827,338 A | 10/1998 | Horvat |
| 5,853,577 A | 12/1998 | Gizowski et al. |
| 5,860,187 A | 1/1999 | Flaszynski et al. |
| 5,900,043 A | 5/1999 | Grandjean et al. |
| 5,930,994 A | 8/1999 | Shimato et al. |
| 5,961,678 A | 10/1999 | Pruette et al. |
| 5,988,989 A | 11/1999 | Hobson |
| 6,010,547 A | 1/2000 | Jeong et al. |
| 6,029,448 A | 2/2000 | Hobson |
| 6,109,040 A | 8/2000 | Ellison, Jr. et al. |
| 6,241,878 B1 | 6/2001 | Snaper |
| 6,251,294 B1 | 6/2001 | Davis et al. |
| 6,347,785 B1 * | 2/2002 | Copp et al. ............ 251/149.6 |
| 6,447,583 B1 | 9/2002 | Thelen et al. |
| 6,526,753 B1 | 3/2003 | Bailey |
| 6,620,217 B2 | 9/2003 | Bruckmann et al. |
| 6,641,646 B2 | 11/2003 | Rosenberg |
| 6,644,023 B2 | 11/2003 | Hirota et al. |
| 6,663,694 B2 | 12/2003 | Hubbard et al. |
| 6,755,016 B2 | 6/2004 | Dittler et al. |
| 6,793,716 B2 | 9/2004 | Rigaudeau et al. |
| 6,797,037 B2 | 9/2004 | Golner et al. |
| 6,827,763 B2 | 12/2004 | McGee et al. |
| 6,833,017 B2 | 12/2004 | Quigley |
| 6,835,224 B2 | 12/2004 | Cheng |
| 6,840,387 B2 | 1/2005 | Beer et al. |
| 6,857,262 B2 | 2/2005 | Rendahl et al. |
| 6,893,487 B2 | 5/2005 | Alger et al. |
| 6,902,592 B2 * | 6/2005 | Green et al. .................. 55/302 |
| 7,002,029 B2 | 2/2006 | Davis |
| 7,008,461 B2 * | 3/2006 | Kuki et al. ................. 55/282.3 |
| 7,025,811 B2 | 4/2006 | Streichsbier et al. |
| 7,047,731 B2 | 5/2006 | Foster et al. |
| 2004/0016699 A1 | 1/2004 | Bayevsky |
| 2004/0068971 A1 * | 4/2004 | Kuki et al. .................... 55/523 |
| 2004/0103788 A1 | 6/2004 | Streichsbier et al. |
| 2004/0112218 A1 | 6/2004 | Steiner |
| 2004/0120836 A1 | 6/2004 | Dai et al. |
| 2004/0226290 A1 | 11/2004 | Bailey |
| 2005/0011357 A1 | 1/2005 | Crawley |
| 2005/0139705 A1 | 6/2005 | McGovern et al. |
| 2005/0178111 A1 | 8/2005 | Kammel |
| 2005/0191218 A1 | 9/2005 | Alward et al. |
| 2005/0252375 A1 | 11/2005 | Iles et al. |
| 2006/0201326 A1 | 9/2006 | Wagner et al. |
| 2006/0201327 A1 | 9/2006 | Janse Van Rensburg et al. |

FOREIGN PATENT DOCUMENTS

| | | |
|---|---|---|
| EP | 0 308 972 A | 3/1989 |
| EP | 0 930 422 A1 | 7/1999 |
| EP | 1336729 A1 | 8/2003 |
| GB | 2371246 A | 7/2002 |
| JP | 4-31613 | 2/1992 |
| JP | 07 47214 A | 2/1995 |
| JP | 7-54632 | 2/1995 |
| JP | 7-63038 | 3/1995 |
| JP | 07 289835 A | 11/1995 |
| JP | 08 14026 A | 1/1996 |
| JP | 177462 A | 7/1996 |
| WO | WO 01/65080 A1 | 9/2001 |

OTHER PUBLICATIONS

"CombiClean™ Environmentally-friendly filter cleaning" (2 pages) (www.lubrizol.com/enginecontrol) Visited Jul. 13, 2004.
"CombiClean™ Diesel Particulate Filter Cleaning Station" (2 pages) (www.lubrizol.com/enginecontrol) Visited Jul. 13, 2004.
"CombiClean™ Diesel Particulate Filter Cleaning System—Operating Instructions" (1 page) (www.lubrizol.com/enginecontrol) Visited Jul. 13, 2004.
"Vacuum Tanks & Pumps" domestic Corporation Marine Systems (3 pages).
"Vacuum Tank Parts List & Diagram" Domestic Corporation Marine Systems (1 page).
"Piezo Technology" Piezolith 3000 document (2 pages).
Cleaire, Filter Cleaning System (1 page) (publication date unknown).
CleanAir Systems, AeroCLEAN PERMIT Filter Cleaning System Operations Manual, 2003 (11 pages).
FSX Inc., Diesel Particulate Filter (DPF) Cleaning (http://www.fsxinc.com/filter.htm), downloaded Jun. 14, 2007 (1 page).
Lubrizol, CombiClean Diesel Particulate Filter Cleaning Station, Mar. 2003 (2 pages).
U.S. Appl. No. 10/958,226, Office Action mailed Oct. 24, 2006, Examiner Robert Clemente.
U.S. Appl. No. 10/958,226, Amendment dated Apr. 24, 2007, Examiner Robert Clemente.
U.S. Appl. No. 10/958,226, final Office Action mailed Jun. 19, 2007, Examiner Robert Clemente.

U.S. Appl. No. 10/958,226, Amendment After Final dated Sep. 19, 2007, Examiner Robert Clemente.

U.S. Appl. No. 11/067,008, Office Action mailed Jul. 9, 2007, Examiner Robert Clemente.

U.S. Appl. No. 11/067,008, Reply to Office Action dated Oct. 9, 2007, Examiner Robert Clemente.

U.S. Appl. No. 11/262,517, Office Action mailed Aug. 24, 2007, Examiner Robert Clemente.

U.S. Appl. No. 11/066,996, Office Action mailed Sep. 7, 2007, Examiner Minh Pham.

* cited by examiner

FILTER SERVICE SYSTEM AND METHOD

PRIORITY DATA

This application is a continuation-in-part of U.S. application Ser. No. 10/958,226, filed Oct. 5, 2004, the contents of which are incorporated herein by reference.

TECHNICAL FIELD

The present disclosure relates generally to a filter service system and, more particularly, to a system for removing matter from a filter.

BACKGROUND

Engines, including diesel engines, gasoline engines, natural gas engines, and other engines known in the art, may exhaust a complex mixture of pollutants. The pollutants may be composed of gaseous and solid material, including particulate matter, nitrogen oxides ("NOx"), and sulfur compounds.

Due to heightened environmental concerns, engine exhaust emission standards have become increasingly stringent over the years. The amount of pollutants emitted from an engine may be regulated depending on the type, size, and/or class of engine. One method that has been implemented by engine manufacturers to comply with the regulation of particulate matter, NOx, and sulfur compounds exhausted to the environment has been to remove these pollutants from the exhaust flow of an engine with filters. However, extended use and repeated regeneration of such filters may cause the pollutants to build up in the components of the filters, thereby causing filter functionality and engine performance to decrease. Moreover, regenerating filters through conventional methods may take up to eight hours or longer, depending on, for example, the size of the filter, the configuration and material composition of the filter media, and the type of heat source used. Such a long regeneration period may be undesirable in some work machine environments. In addition, the temperatures required for regeneration may be in excess of 500 degrees Celsius (932 degrees Fahrenheit). At such temperatures, soot contained within the filter may spontaneously combust, resulting in damage to the filter and/or its components.

One method of removing built-up pollutants from a filter may be to remove the clogged filter from the work machine to which it is connected and direct a flow of gas through the filter in a direction that is opposite the direction of normal flow. The filter may be large, heavy, and difficult to disconnect, however, making it cumbersome, time consuming, and dangerous to remove the filter from the engine of the work machine for servicing.

Another method of removing matter from a filter may be to divert an exhaust flow from the clogged filter to a separate filter, without disconnecting either filter from the engine. While the exhaust flow is diverted, air may be directed through the clogged filter in a direction opposite the normal flow. Since such matter removal systems include a second filter, however, they may be larger and more costly than single filter systems. In addition, since these systems are not disconnected or removed from the engine during cleaning, the user may not be able to manipulate the reverse flow of air within the housing of the clogged filter. Thus, matter that is located out of the direct path of the reverse flow may be difficult to remove from such systems. Furthermore, such systems may not be capable of applying a negative pressure or vibration to the clogged filter to assist in removing the matter. Finally, such systems may not be capable of quickly drying matter captured by the filter instead of undergoing a lengthy regeneration process at high temperatures.

U.S. Pat. No. 5,566,545 ("the '545 patent") teaches a system for removing particulate matter from an engine filter. In particular, the '545 patent discloses a filter connected to an engine exhaust line, a valve structure within the exhaust line, and an air feeder. When air is supplied to the filter in a reverse flow direction, the air may remove captured particulates from the filter.

Although the '545 patent may teach the removal of matter from a filter using a reversed flow, the system described therein requires the use of a second filter during the reverse flow condition, thereby increasing the overall cost and size of the system. In addition, the system does not allow for the manipulation of the reverse flow of air within the filter during matter removal. Moreover, the system is not capable of supplying a negative pressure or vibration to the filter to assist in the filter cleaning process. Finally, the system of the '545 patent is not capable of reduced cleaning times, nor does the system avoid the risk of potential damage to the filter caused by high temperature regeneration.

The present disclosure is directed to overcoming one or more of the problems set forth above.

SUMMARY OF THE INVENTION

In one embodiment of the present disclosure, a system for removing matter from a filtering device of a work machine includes a gas pressurization assembly. An element of the gas pressurization assembly is removably attachable to a first orifice of the filtering device without removing the filtering device from a work machine to which the filtering device is connected. The system also includes a heat source fluidly connected to the gas pressurization assembly.

In another embodiment of the present disclosure, a system for removing matter from a filtering device of a work machine includes a gas pressurization assembly including a gas storage device coupled to a gas source. An element of the gas pressurization assembly is removably attachable to a first orifice of the filtering device without removing the filtering device from a work machine to which the filtering device is connected. The system also includes a heat source fluidly connected to the gas pressurization assembly and a vibration device removably attachable to the filtering device without removing the filtering device from the work machine.

In yet another embodiment of the present disclosure, a method of removing matter from a filtering device of a work machine includes connecting a gas pressurization assembly to a first orifice of the filtering device while the filtering device is connected to a work machine. The method also includes increasing the temperature of a flow of compressed gas supplied by the gas pressurization assembly and directing the flow of heated compressed gas to at least a portion of the filtering device without regenerating the filtering device.

In still another embodiment of the present disclosure, a method of removing matter from a filtering device of a work machine includes manipulating a component of an access assembly coupled to an orifice of the filtering device. The access assembly is removably attached to the orifice. The method also includes fluidly connecting a service system to the orifice while the filtering device is connected to the work machine and providing a flow of compressed gas from the service system to the filtering device.

DETAILED DESCRIPTION

Exemplary embodiments of the present disclosure are illustrated in the accompanying drawings. Wherever possible, the same reference numbers will be used throughout the drawings to refer to the same or like parts.

Figure 1:
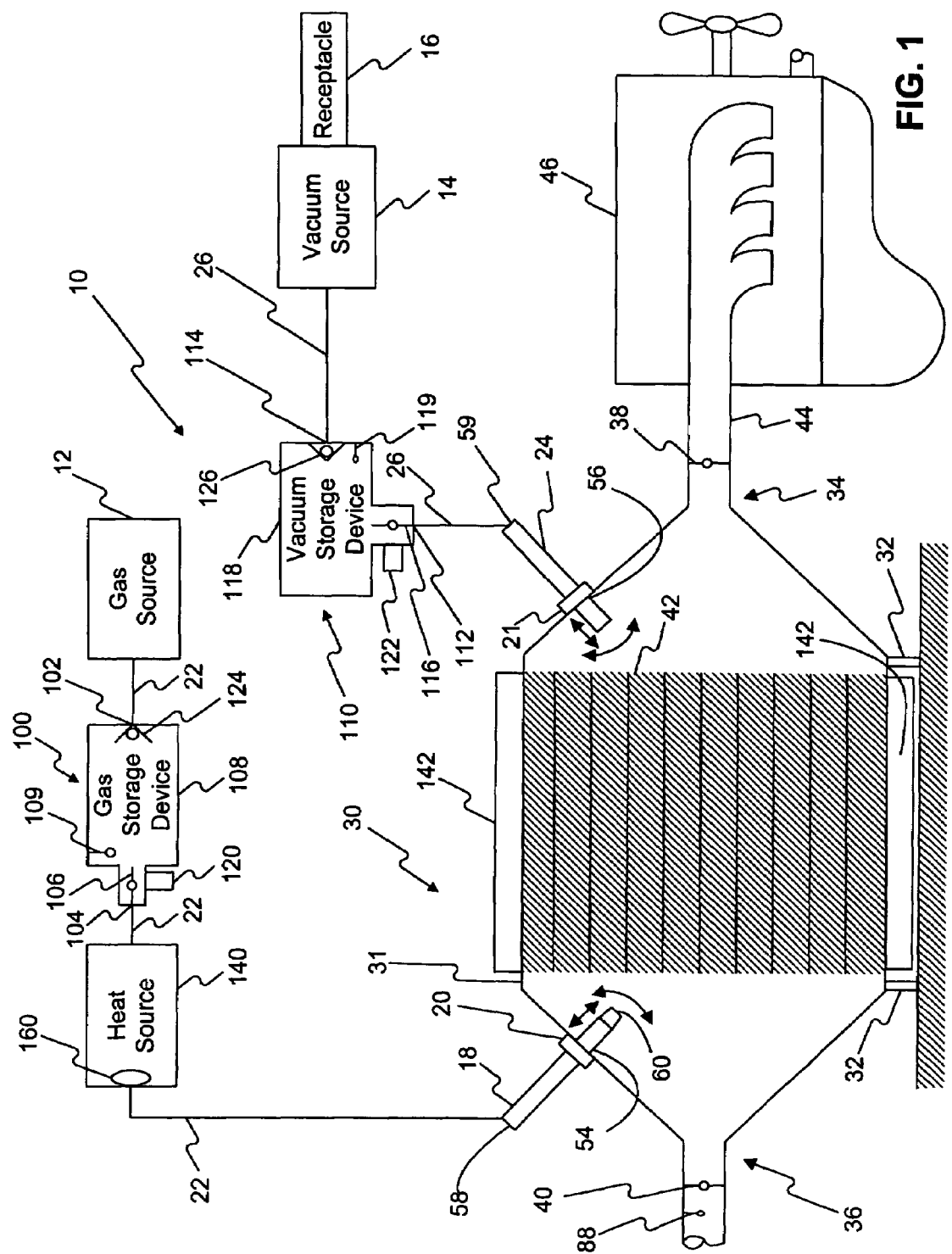
FIG. 1 is a diagrammatic illustration of a service system connected to a filter according to an exemplary embodiment of the present disclosure.

FIG. 1 illustrates an exemplary embodiment of a service system 10 attached to a filter 30. The service system 10 may include at least one of a gas source 12, a gas line 22, a gas storage device 100, a heat source 140, a vibration device 142, and a flow distribution device 18. The service system 10 may further include at least one of a vacuum source 14, a vacuum line 26, a vacuum storage device 110, a flow receiving device 24, and a receptacle 16. The service system 10 may be operatively attached to the filter 30 for service and may be removed from the filter 30 when service is complete. As such, a user may operatively attach and remove the service system 10 without removing the filter 30 from the work machine, vehicle, or other device to which the filter 30 is attached. Alternatively, a user may operatively attach and remove the service system 10 to the filter 30 upon removing the filter 30 from the device to which the filter 30 is attached. As used herein, the term "work machine" may include on-road vehicles, off-road vehicles, and stationary machines, such as, for example, generators and/or other exhaust-producing devices.

In some embodiments of the present disclosure, the filter 30 may be connected to an internal combustion engine 46, such as, for example, a diesel engine. The engine 46 may include an exhaust line 44 connecting an exhaust flow of the engine 46 with an inlet 34 of the filter 30. The engine 46 may also include a turbocharger (not shown) connected to the exhaust line 44. In such an embodiment, the inlet 34 of the filter 30 may be connected to an outlet of the turbocharger.

An inlet valve 38 may be disposed between the exhaust line 44 of the engine 46 and the inlet 34 of the filter 30. The inlet valve 38 may be configured to allow an exhaust flow of the engine 46 to pass into the filter 30. Alternatively, in some situations, the inlet valve 38 may block communication between the engine 46 and the filter 30. Such a configuration may be advantageous during, for example, servicing of the filter 30. In one embodiment of the present disclosure, while the filter 30 is being serviced, the inlet valve 38 may be closed to prohibit captured material from flowing back to the engine 46. In such an embodiment, the engine 46 may be turned off during the servicing and, thus, may not produce an exhaust flow. The inlet valve 38 may be controlled and/or actuated by any means known in the art, such as, for example, a solenoid or pneumatics. Alternatively, the inlet valve 38 may be manually controlled.

In some embodiments, one or more work machine diagnostic devices 88 may be disposed proximate an outlet 36 of the filter 30. The work machine diagnostic devices 88 may be, for example, part of the work machine or other device to which the filter 30 is connected and may be external to the filter 30. Alternatively, the work machine diagnostic devices 88 may be internal to the filter 30. Work machine diagnostic devices 88 may be any sensing devices known in the art, such as, for example, flow meters, emission meters, pressure transducers, or other sensors. Such work machine diagnostic devices 88 may sense, for example, an increase in the levels of soot, NOx, or other pollutants leaving the filter 30. The work machine diagnostic devices 88 may send pollutant level information to a controller or other device (not shown) and may assist in, for example, triggering filter regeneration and/or filter servicing. It is understood that, as used herein, the term "regeneration" means oxidization of carbonaceous soot and hydrocarbons.

Filter 30 may further include an outlet valve 40 disposed proximate an outlet 36 of the filter 30. Outlet valve 40 and inlet valve 38 may be the same type of valve or may be different types of valves, depending on the requirements of the application. The valves 38, 40 may be, for example, poppet valves, butterfly valves, or any other type of controllable flow valves known in the art. For example, the valves 38, 40 may be controlled to allow any range of exhaust flow to pass from the engine 46 to the filter 30 and out of the filter 30. The valves 38, 40 may be positioned to completely restrict an exhaust flow of the engine 46 or may allow the flow to pass unrestricted. The valves 38, 40 may be connected to the filter 30 by any conventional means known in the art.

The filter 30 may be any type of filter known in the art, such as, for example, a foam cordierite, sintered metal, or silicon carbide type filter. As illustrated in FIG. 1, the filter 30 may include filter media 42. The filter media 42 may include any material useful in removing pollutants from an exhaust flow. In some embodiments of the present disclosure, the filter media 42 may contain catalyst materials capable of collecting, for example, soot, NOx, sulfur compounds, particulate matter, and/or other pollutants known in the art. Such catalyst materials may include, for example, alumina, platinum, rhodium, barium, cerium, and/or alkali metals, alkaline-earth metals, rare-earth metals, or combinations thereof. The filter media 42 may be situated horizontally (as shown in FIG. 1), vertically, radially, or helically. The filter media 42 may also be situated in a honeycomb, mesh, or any other configuration so as to maximize the surface area available for the filtering of pollutants.

The filter 30 includes a filter housing 31 and may be secured by any means known in the art. The filter 30 may include, for example, filter brackets 32 connected to the filter housing 31. Filter brackets 32 may be made of metal, plastic, rubber, or any other material known in the art to facilitate connecting a filter to a structure associated with the engine 46. For example, filter brackets 32 may secure the filter 30 to a work machine and may dampen the filter 30 from vibration, jarring, or sudden movements of the work machine to which the filter 30 is attached. As will be described in greater detail below, in an exemplary embodiment, the service system 10 may further include a vibration device 142 configured to act on the filter 30. In such an embodiment, the filter brackets 32 may be configured to secure the filter 30 to the work machine while allowing at least a portion of the filter 30 to vibrate in response to actuation by the vibration device 142.

As shown in FIG. 1, the gas line 22 may connect various components of the service system 10 to allow, for example, a gas to pass from the gas source 12 to the flow distribution device 18 and into the filter 30. The gas line 22 may be any type of tubing, piping, or hose known in the art. The gas line 22 may be, for example, plastic, rubber, aluminum, copper, steel, or any other material capable of delivering a compressed gas in a controlled manner, and may be flexible or rigid. The length of the gas line 22 may be minimized to facilitate operation of the service system 10, while reducing the pressure drop between the gas source 12 and the filter 30.

The gas source 12 may include, for example, an air compressor or any other device capable of compressing a gas and delivering the compressed gas through the gas line 22. In one exemplary embodiment of the present disclosure, the gas source 12 may be a shop air compressor of a type known in the art and may supply compressed air, or any other gas, at approximately 70 to 110 psi. This range may be increased or decreased depending on the size of the gas source 12 used. The gas source 12 may deliver a gas in either a pulsed flow, a uniform flow, or some combination thereof. The gas may be any gas known in the art useful in removing ash or other matter from a filter, such as, for example, air, oxygen, hydrogen, nitrogen, or helium. It is understood that the gas may be capable of being compressed and delivered through the gas line 22.

As shown in FIG. 1, an exemplary embodiment of the service system 10 may further include a gas storage device 100. The gas storage device 100 may be located downstream of the gas source 12 and an outlet of the gas source 12 may be fluidly connected to a gas storage device inlet 102 by the gas line 22. The gas storage device 100 may be any device capable of storing a pressurized gas. The gas storage device 100 may include, for example, a high pressure gas tank or an expandable storage container. In embodiments where the gas storage device 100 contains a pressurized gas before being fluidly connected to the service system 10 of the present disclosure, the gas source 12 may be omitted. The gas storage device 100 may be made of any material known in the art and may be rigid or flexible. Such materials may include, for example, steel, cast iron, copper, aluminum, titanium, and/or any alloys or combinations thereof. In addition, the gas storage device 100 may also be made from plastic, rubber, vinyl, polytetrafloroethylene, expanded polytetrafloroethylene, or some derivative or combination thereof. In yet another alternative, the gas storage device 100 may be made from a combination of any of the metals and/or nonmetals described above.

The gas storage device 100 may have any capacity useful in supplying a controlled volume of high pressure gas to a device, such as, for example, a filter. The gas storage device 100 may be capable of storing gas at any desirable pressure relative to atmosphere. For example, in one embodiment of the present disclosure, the gas storage device 100 may be capable of storing pressurized gas in a range that may be safe for servicing filters containing, for example, cordierite plugs. Such plugs and other like filter media 42 may not be capable of withstanding a pressure of greater than approximately 150 psi without sustaining damage.

The gas storage device 100 may include at least one gas storage device sensor 109 capable of sensing, for example, flow, pressure, temperature, or other flow metrics known in the art. The couplings or other means used to fluidly connect the gas storage device 100 to, for example, gas line 22 may be sized and otherwise designed to form a sealed connection regardless of the gas pressure within the gas storage device 100. The wall thickness of the gas storage device housing 108 may also be appropriate for such pressures. In addition, the gas storage device 100 may be advantageously shaped to store and controllably release a desired volume of pressurized gas. For example, the gas storage device 100 may be cylindrical or spherical to maximize structural integrity.

A gas storage device valve 106 may be disposed proximate a gas storage device outlet 104. The gas storage device valve 106 may be, for example, a poppet valve, butterfly valve, controllable membrane, or any other type of controllable flow regulation device known in the art. For example, the gas storage device valve 106 may be controlled to allow any range of gas to pass from the gas source 12 to the heat source 140 through the gas line 22. The gas storage device valve 106 may be positioned to completely restrict a flow of gas from the gas source 12 or may allow the flow to pass unrestricted. The gas storage device valve 106 may be connected to the gas storage device 100 by any conventional means known in the art. In some embodiments, the gas storage device valve 106 may be controlled to fully open and/or fully close at relatively high speeds. This high speed movement may be facilitated by a high speed control mechanism 120. The high speed control mechanism 120 may include, for example, an electric, piezoelectric, pneumatic, hydraulic, or other controller. In some embodiments, the high speed control mechanism 120 may be a solenoid, servo motor, or other conventional means.

The gas storage device 100 may also include a check valve 124 disposed proximate the gas storage device inlet 102. The check valve 124 may be configured to permit compressed gas to flow into the gas storage device 100 from the gas source 12 and to prohibit gas from exiting through the gas storage device inlet 102. The check valve 124 may, thus, assist in the storage of pressurized gas within the gas storage device 100.

It is understood that in further embodiments of the present disclosure, various other flow paths may be used to direct a flow from the gas source 12 to the flow distribution device 18. For example, in some embodiments, the gas storage device 100 may include a three-way valve (not shown) or other type of valve capable of enabling a user to bypass the gas storage device 100 and to direct a flow of compressed gas from the gas source 12 directly to the heat source 140 or the flow distribution device inlet 58. In other exemplary embodiments, the heat source 140 and/or the gas storage device 100 may be omitted.

The heat source 140 may be any conventional device capable of controllably increasing the temperature of a flow of gas. The heat source 140 may include, for example, a burner 160, an electric heating coil, a compressed or forced air heating element, a microwave heating element, and/or other gas heating devices known in the art. Gas supplied to the heat source 140 may, for example, pass over or proximal an electric coil of the heat source 140 and the temperature of the gas may increase as a result of heat energy transferred to the gas by the electric coil. As shown in FIG. 1, the heat source 140 may be fluidly connected to the gas storage device 100 by the gas line 22 and may be configured to receive a flow of gas from the gas source 12 and/or the gas storage device 100. The heat source 140 may also be electrically connected to a controller (not shown) or other control device known in the art capable of, for example, turning the device on and off, and/or controlling the temperature of a flow of gas that is passed through the heat source 140. It is understood that the heat source 140 may also be manually controlled. As shown schematically in FIG. 1, a flow of gas may pass from the heat source 140 to the flow distribution device through the gas line 22.

The heat source 140 may be capable of heating a flow of gas to any temperature known to assist in removing matter from a filter. In an exemplary embodiment of the present disclosure, the heat source 140 may be capable of heating a flow of gas to temperatures in excess of approximately 200 degrees Celsius (392 degrees Fahrenheit). In such an embodiment, the heated flow of gas may be capable of drying, for example, soot captured within the filter 30. As will be described in greater detail below, the service system 10 may be configured to remove this dried soot from the filter 30. In another exemplary embodiment, the heat source 140 may be capable of heating a flow of gas to temperatures in excess of approximately 500 degrees Celsius (932 degrees Fahrenheit). In such an embodiment, the heated flow of gas may be capable of substantially or completely regenerating the filter 30. In still another embodiment (not shown), the heat source 140 may include a heating device configured to heat the filter 30, such as, for example, electric heating tape. In such an embodiment, the heat source 140 may be disposed on an inner surface of the filter housing 31 to increase the temperature of the filter 30. As described above, the heat source 140 of the present embodiment may be capable of heating, for example, the filter 30 to temperatures in excess of approximately 200 degrees Celsius (392 degrees Fahrenheit). Heating the filter 30 in such a way may assist in drying, for example, soot captured within the filter 30. It is understood that such a heat source 140 may be used with or without a flow of gas passing through the filter 30.

The flow distribution device 18 may be rigidly connected to a first orifice 54 formed in filter housing 31. Alternatively, the flow distribution device 18 may be removably attached to the filter housing 31. This connection may be facilitated by a boss 20. In some embodiments, at least a portion of the flow distribution device 18 may be internal to the filter housing 31. In such an embodiment, the flow distribution device 18 may have unobstructed access to substantially all of the filter media 42 within the filter 30.

The flow distribution device 18 may be any device capable of distributing a compressed gas in a controlled manner. The flow distribution device 18 may be, for example, a nozzle, a diffuser, or any other like device known in the art. The flow distribution device 18 may be a one-piece device or may be made of two or more pieces or parts operatively connected to one another. The flow distribution device 18 may be made of, for example, plastic, polyvinyl, steel, copper, aluminum, titanium, or any other material known in the art.

The flow distribution device 18 may be, for example, substantially hollow, substantially cylindrical, and/or any other shape useful in controllably distributing a compressed gas. The shape and configuration of the flow distribution device 18 may enable insertion through, manipulation within, and removal from the rigid first orifice 54 of the filter housing 31. The flow distribution device 18 may be adjustably movable into and out of the filter 30, and may swivel within the filter 30 such that the user may position the flow distribution device 18 as close to the filter media 42 as is desirable for assisting in matter removal. The adjustability of the flow distribution device 18 is illustrated by the arrows in FIG. 1. Thus, the flow distribution device 18 may be manipulated or otherwise positioned to obtain maximum gas distribution across the filter media 42. The flow distribution device 18 may further include a stop (not shown), which may limit the distance that the flow distribution device 18 may be inserted into the filter 30 and may prevent damage to the filter media 42. In some embodiments of the present disclosure, the stop may be fixedly attached to the flow distribution device 18, while in other embodiments, the stop may be adjustable.

Figure 2:
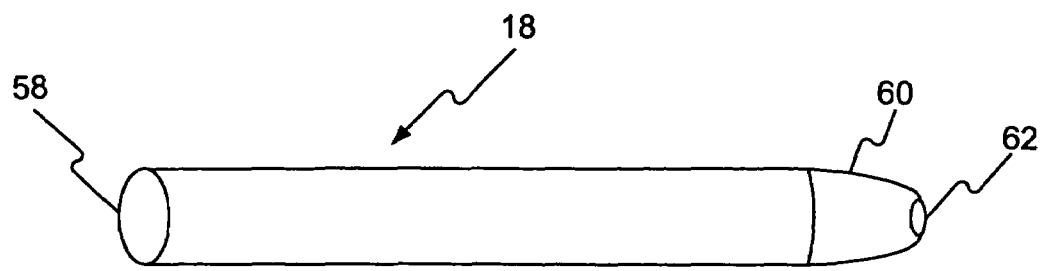
FIG. 2 is a side view of the flow distribution device of FIG. 1 according to an embodiment of the present disclosure.

As illustrated in FIG. 2, the tip 60 of the flow distribution device 18 may include at least one hole 62. The hole 62 may be of any size, shape, and/or angle to facilitate the delivery of a compressed gas. The flow distribution device 18 may deliver a compressed gas across at least a portion of filter media 42. It is understood that in some embodiments of the present disclosure, the flow distribution device 18 may be capable of delivering a compressed gas across substantially an entire cross-section of the filter media 42. The size, location, and angle of hole 62 may be selectively determined based on the desired distribution and pressure of the gas delivered by the flow distribution device 18.

Figure 3:
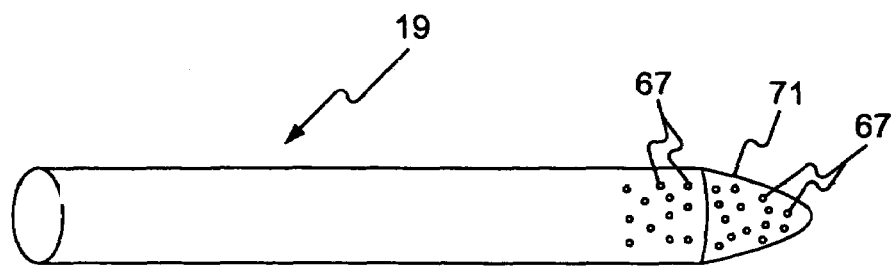
FIG. 3 is a side view of a flow distribution device according to another embodiment of the present disclosure.

As illustrated in FIG. 3, an alternative flow distribution device 19 may include a number of holes 67. The holes 67 may be evenly spaced or unevenly spaced and may be at any angle to facilitate the desired distribution of compressed gas across at least a portion of the filter media 42. The holes 67 may be positioned at the tip 71 of the flow distribution device 19 and may also be positioned along at least a portion of the length of flow distribution device 19. The holes 67 may be of the same or different sizes.

Figure 4:
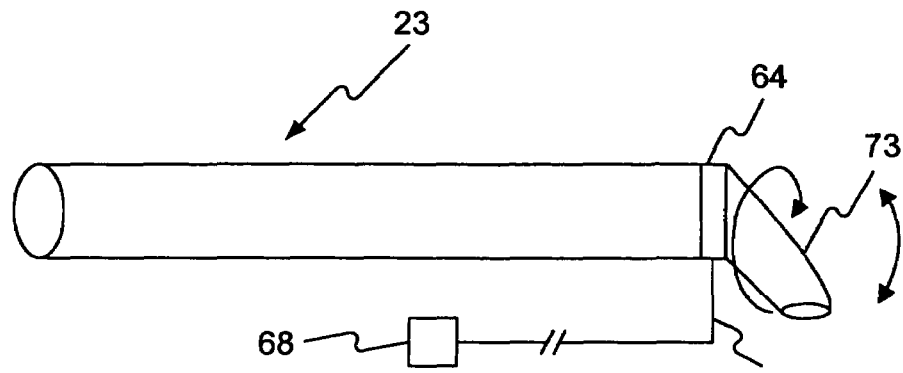
FIG. 4 is a side view of a flow distribution device according to yet another embodiment of the present disclosure.

As shown in FIG. 4, another alternative flow distribution device 23 may include an angled tip 73. The angle of tip 73 may be selected so as to produce a desired distribution of compressed gas across at least a portion of filter media 42. The flow distribution device 23 may further include an actuation device 64. The tip 73 may be movable in the X, Y, and/or Z direction when the actuation device 64 is utilized. For example, the actuation device 64 may enable the user to rotate the tip 73 of the flow distribution device 23 a full 360 degrees. The actuation device 64 may also enable the user to tilt the tip 73 at any angle useful in disbursing a compressed gas across at least a portion of filter media 42. It is understood that the actuation device 64 may be used in conjunction with any embodiment of the tip 60, 71, 73 to facilitate the tip's motion.

The actuation device 64 may be connected to a controller 68 by an actuation device line 66. The controller 68 may be, for example, a central processing unit, an electronic control module, a computer, a radio transmitter, or any other type of controller known in the art. The controller 68 may be connected to an operator interface (not shown), such as, for example, a switch, rod, lever, joy stick, or any other device enabling a user to manipulate a mechanical component remotely. The connection made between the actuation device 64 and the controller 68 via actuation device line 66 may be an electric or fluid connection. Although shown in FIG. 4 as being outside of the flow distribution device 23, it is understood that the actuation device line 66 may connect to the actuation device 64 and may travel within a hollow passage of the flow distribution device 23 until exiting the flow distribution device 23 outside of the filter 30. This path of travel may assist in forming a substantially air tight seal between the flow distribution device 23 and the filter housing 31. It is understood that in embodiments where the actuation device 64 is radio controlled, the actuation device line 66 may be omitted.

Figure 5:
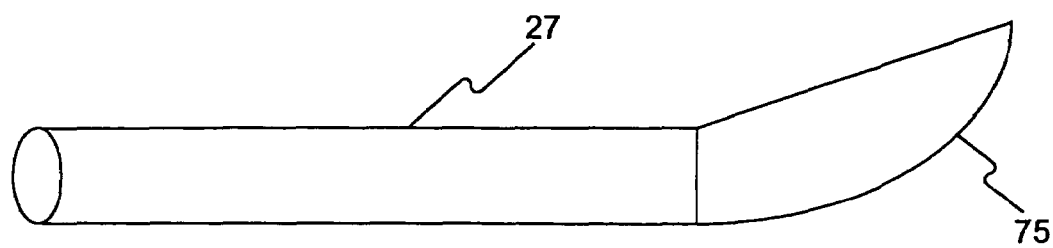
FIG. 5 is a side view of a flow distribution device according to another embodiment of the present disclosure.
Figure 6:
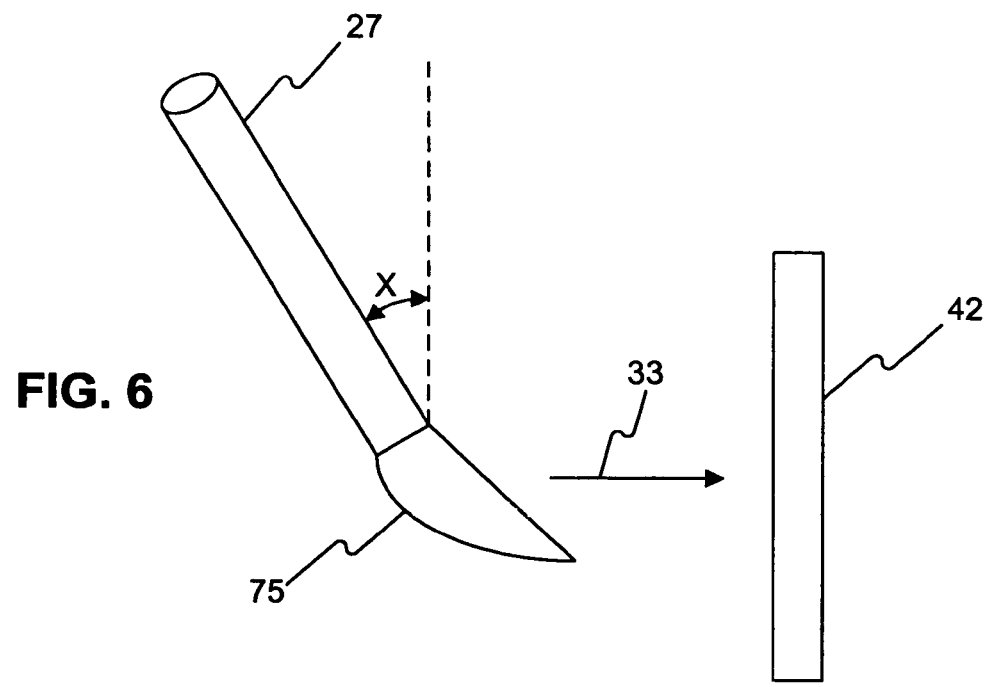
FIG. 6 is a side view of the flow distribution device of FIG. 5.

As shown in FIG. 5, yet another alternative flow distribution device 27 may include an angled tip 75 having a shovel-like or scoop-like configuration. The angle of tip 75 may be selected so as to produce a desired distribution of compressed gas across at least a portion of filter media 42 and may direct compressed gas in a direction substantially parallel to the normal flow of exhaust gas through the filter 30 (discussed in greater detail below). Accordingly, the angle of tip 75 may be chosen depending on the angle at which the flow distribution device 27 is disposed relative to the filter media 42. For example, in some embodiments, the flow distribution device 27 may be positioned at an angle X relative to the filter media 42. As shown in FIG. 6, in such an embodiment, the tip 75 may be angled to direct a flow of gas substantially perpendicular to filter media 42, as illustrated by arrow 33.

Figure 7:
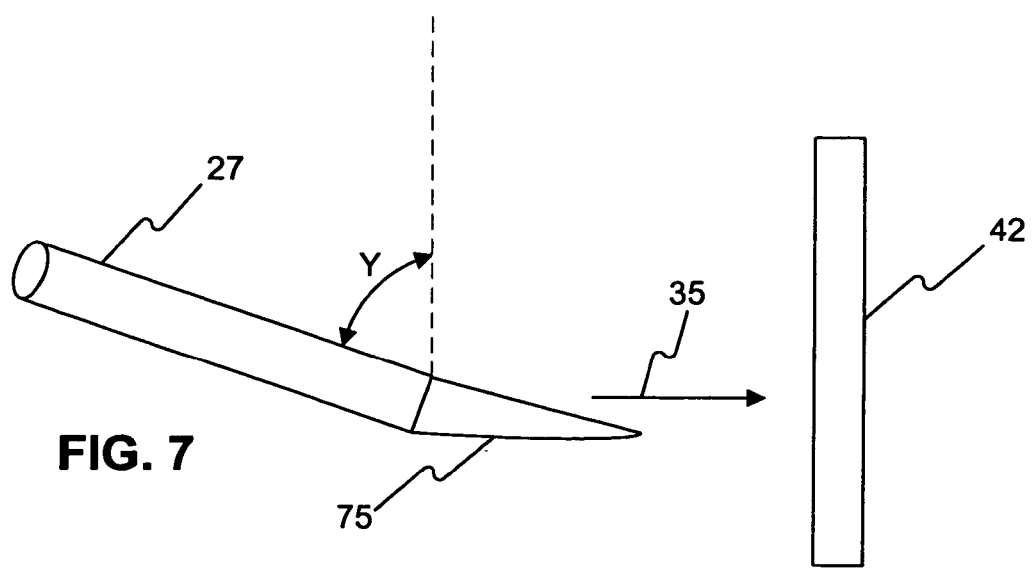
FIG. 7 is another side view of the flow distribution device of FIG. 5.

In other embodiments, the flow distribution device 27 may be positioned, for example, at a larger angle Y relative to the filter media 42. As shown in FIG. 7, in such embodiments, the tip 75 may have a complementary angle and may be configured to direct a flow of gas substantially perpendicular to filter media 42, as illustrated by arrow 35. It is understood that in embodiments where the flow distribution device 27 is positioned, for example, at a 90 degree angle relative to the filter media 42, the tip 75 may be omitted. In some embodiments, the tip 75 may be retractable within the flow distribution device 27 such that the tip 75 may be disposed within the flow distribution device 27 when the flow distribution device 27 is being inserted into and removed from the filter 30.

Figure 8:
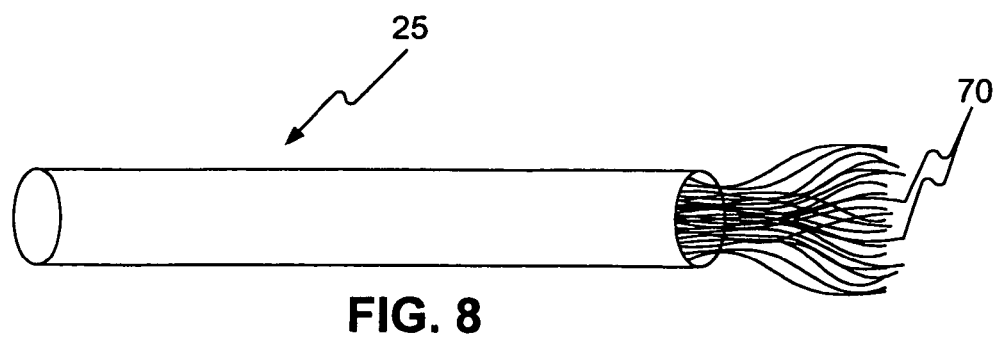
FIG. 8 is a side view of a flow distribution device according to a further embodiment of the present disclosure.

FIG. 8 illustrates a further embodiment of a flow distribution device 25. In this embodiment, the flow distribution device 25 may include a plurality of hollow legs 70. The legs 70 may be configured to deliver a compressed gas across at least a portion of filter 30. The legs 70 may be flexible so as to be movable independent of the flow distribution device 25 when a compressed gas is supplied thereto. The legs 70 may be, for example, flexible air flow fibers of a type known in the art. In this embodiment, the tip may be omitted, and the legs 70 may be fluidly connected directly to the flow distribution device 25 such that substantially all of the gas supplied by the flow distribution device 25 passes through the legs 70.

The rigid or removably attachable connection between the flow distribution device 18 and the filter housing 31 may be facilitated by the boss 20. The boss 20 may be any type of boss known in the art and may be made of any material known in the art to be useful in rigidly or otherwise operatively connecting a device, such as a flow distribution device 18, to another device, such as a filter 30. Such materials may include, for example, steel, aluminum, copper, tin, plastic, vinyl, and/or rubber. The inside diameter of the boss 20 and, thus, the size and/or type of the boss 20, may be determined by the size and/or type of the flow distribution device 18 to be used.

The boss 20 may enable a user to manually manipulate an end of the flow distribution device 18 that is outside of the filter 30 so as to desirably distribute compressed gas across at least a portion of the filter media 42. In such an embodiment, the connection may be substantially airtight. A sheath, wrap, or other flexible connection mechanism (not shown) may facilitate the substantially airtight connection between the flow distribution device 18 and the boss 20, while still enabling the user to operatively manipulate an end of the flow distribution device 18. It is understood that in embodiments where the flow distribution device 18 is removably attached to the filter housing 31 or is otherwise relatively movable with respect to the filter media 42 while connected thereto, the gas line 22 may be flexible so as to facilitate the flow distribution device's installation, movement, and removal. Alternatively, the flow distribution device 18 may be fixedly attached to the filter housing 31 such that the flow distribution device 18 may not be movable with respect to filter media 42 once connected to the boss 20. The boss 20 may be fixedly mounted to an outer surface of filter housing 31 by any connection means known in the art, such as, for example, weldments, adhesives, screws, and/or brackets.

In an embodiment where the flow distribution device 18 is removably attached to the filter 30 through the boss 20, the inside diameter of the boss 20 may be smooth in order to facilitate relative movement therebetween. The inside diameter of the boss 20 may also be slightly larger than the outside diameter of the flow distribution device 18 to facilitate movement while maintaining the proper seal. In other embodiments where the flow distribution device 18 is removably attached to the filter 30, the inside diameter of the boss 20 may be threaded. In such embodiments, the outside diameter of the flow distribution device 18 may include threads corresponding to those located on the inside diameter of the boss 20 so as to facilitate a connection therebetween.

Alternatively, in embodiments where the flow distribution device 18 is fixedly attached to the boss 20 such that there is no relative movement between the flow distribution device 18 and the filter 30, the flow distribution device 18 may be connected to the boss 20 by any connection means known in the art, such as, for example, weldments, adhesives, screws, and/or brackets.

As shown in FIG. 1, the vacuum source 14 of the service system 10 may be connected to components of the service system 10, such as, for example, the vacuum storage device 110 and the flow receiving device 24 by vacuum line 26. The vacuum source 14 may also include a receptacle 16. The flow receiving device 24 may be connected to a second orifice 56 of the filter housing 31. Alternatively, the flow receiving device 24 may be rigidly connected or removably attached to the filter housing 31 via a boss 21. It is understood that the connection between the flow receiving device 24 and the boss 21 may have gaseous and mechanical characteristics similar to the connection between the flow distribution device 18 and the boss 20.

The boss 21 may be any type of boss known in the art and may have mechanical characteristics similar to those of boss 20. The inside diameter of the boss 21 may be sized to fit the outside diameter of the flow receiving device 24 and, in some embodiments of the present disclosure, boss 21 may be the same as boss 20. Like boss 20, boss 21 may be attached to the filter housing 31 by any conventional means and the location of boss 21 corresponds to the location of the second orifice 56. Boss 21 may facilitate a substantially airtight connection between the filter 30 and the flow receiving device 24. This connection may be rigid, threaded, or may allow for movement of the flow receiving device 24 relative to the filter media 42, depending on the requirements of each application. A sheath, wrap, or other flexible connection mechanism (not shown) may facilitate this substantially airtight connection.

The vacuum source 14 may include, for example, a shop vacuum, a vacuum pump, or any other device capable of creating negative pressure within another device. The vacuum source 14 may be of any power or capacity useful in cleaning the filter 30, and its size may be limited by the size and/or type of filter 30 being cleaned. For example, a filter 30 including cordierite plugs may not be capable of withstanding a negative pressure of greater than approximately 150 psi without sustaining damage to the plugs and/or other filter media 42. Thus, a vacuum source 14 used to clean such a filter 30 may have a maximum capacity that is less than approximately 150 psi. In some embodiments of the present disclosure, the vacuum source 14 may supply a constant vacuum to, and thereby create a constant negative pressure within, the filter 30. Alternatively, the vacuum source 14 may supply a pulsed or varying vacuum to the filter 30. The consistency of the vacuum supplied to the filter 30 may vary with each application and may depend on the structure, design, type, and/or other characteristics of the filter 30.

With continued reference to FIG. 1, the receptacle 16 may be fluidly connected to the vacuum source 14. The receptacle 16 may be configured to collect matter removed from the filter 30 and may be removably attached to the vacuum source 14. For example, in some embodiments, as the vacuum source 14 draws matter from the filter 30, the removed matter may pass through a vacuum filter internal to the vacuum source (not shown). In such embodiments, the receptacle 16 may collect and store the matter collected by the vacuum filter. The receptacle 16 may be any size useful in collecting the matter removed from the filter 30 and may have any useful capacity and shape. For example, the receptacle 16 may be cylindrical or box-shaped, and may be a rigid container or a flexible bag. The receptacle 16 may be designed to collect and store matter of any type or composition. In one embodiment of the present disclosure, the receptacle 16 may be designed to store harmful pollutants, such as, for example, ash, and may be made of, for example, steel, tin, reinforced cloth, aluminum, composites, ceramics, or any other material known in the art. The receptacle 16 may be rapidly disconnected and reconnected to the vacuum source 14 to facilitate disposal of the matter collected therein.

In an exemplary embodiment of the present disclosure, the service system 10 may further include a vacuum storage device 110. The vacuum storage device 110 may be located downstream of the vacuum source 14 and an inlet of the vacuum source 14 may be fluidly connected to a vacuum storage device outlet 114 by the vacuum line 26. The vacuum storage device 110 may be any device capable of storing a gas at a negative pressure. The wall thickness of the vacuum storage device housing 118 may be appropriate for such negative pressures. The vacuum storage device 110 may include, for example, a high pressure gas tank and may be made of any material known in the art. The vacuum storage device 110 may have mechanical characteristics similar to the gas storage device 100 and, in some embodiments, the vacuum storage device 110 may be the same as the gas storage device 100. In embodiments where the vacuum storage device 110 contains a gas at a negative pressure before being fluidly connected to the service system 10 of the present disclosure, the vacuum source 14 may be omitted. The vacuum storage device 110 may include at least one vacuum storage device sensor 119 capable of sensing, for example, flow, pressure, temperature, or other flow metrics known in the art.

A vacuum storage device inlet 112 may be fluidly connected to an outlet of the flow receiving device 24 by a vacuum line 26 and a vacuum storage device valve 116 may be disposed proximate the vacuum storage device inlet 112. The vacuum storage device valve 116 may be, for example, a poppet valve, butterfly valve, a controllable membrane, or any other type of controllable flow regulation device known in the art. For example, the vacuum storage device valve 116 may be controlled to allow any range of gas to pass from the filter 30 to the vacuum storage device 110. The vacuum storage device valve 116 may be positioned to completely restrict a flow of gas from the filter 30 or may allow the flow to pass unrestricted. The vacuum storage device valve 116 may be connected to the vacuum storage device 110 by any conventional means known in the art. In some embodiments, the vacuum storage device valve 116 may be controlled to fully open and/or fully close at relatively high speeds. This high speed movement may be facilitated by a high speed control mechanism 122. The high speed control mechanism 122 may include, for example, an electric, piezoelectric, pneumatic, hydraulic, or other controller. In some embodiments, the high speed control mechanism 122 may be a servo motor, solenoid, or other conventional means. The vacuum storage device valve 116 and the high speed control mechanism 122 used to control the vacuum storage device valve 116 may be mechanically similar to the gas storage device valve 106 and the corresponding high speed control mechanism 120 described above. In some embodiments, the vacuum storage device valve 116 and the high speed control mechanism 122 used to control the vacuum storage device valve 116 may be the same as the gas storage device valve 106 and the corresponding high speed control mechanism 120.

The vacuum storage device 110 may further include a check valve 126 disposed proximate the vacuum storage device outlet 114. The check valve 126 may be configured to permit gas to flow to the vacuum source 14 from the vacuum storage device 110, and to prohibit gas from entering the vacuum storage device 110 from the vacuum storage device outlet 114. The check valve 126 may, thus, assist in the storage of gas under a negative pressure within the vacuum storage device 110.

It is understood that in further embodiments of the present disclosure, various other flow paths may be used to direct a flow from the flow receiving device 24 to the vacuum source 14. For example, in some embodiments, the vacuum storage device 110 may include a three-way valve (not shown). The three-way valve may be similar to or the same as the three-way valve described above with respect to the gas storage device 100.

As discussed above, the vacuum line 26 may connect the vacuum source 14 to the vacuum storage device 110. The vacuum line 26 may also connect the vacuum storage device 110 to the flow receiving device 24. These fluid connections may allow a solid, liquid, or gas to pass from the filter 30 and through the flow receiving device 24. It is understood the fluid connection may permit ash or other matter released from the filter media 42 to pass from the filter 30 to the vacuum source 14 and/or to the receptacle 16. The vacuum line 26 may be any type of vacuum line known in the art and may have mechanical characteristics similar to those of gas line 22. The vacuum line 26 may be as short as possible to facilitate operation of the service system 10 and to reduce the pressure drop between the vacuum source 14 and the filter 30. The inside diameter of the vacuum line 26 may be sized to fit the outside diameter of the flow receiving device 24 and, in some embodiments of the present disclosure, vacuum line 26 may be structurally the same as the gas line 22. The vacuum line 26 may be attached to a flow receiving device outlet 59 of the flow receiving device 24 by any conventional means. For example, the vacuum line 26 may be secured to the flow receiving device 24 by adhesives, glue, a compression collar, a ring, matching sets of threads, quick connects, snap fits, or any other conventional means. It is understood that in an embodiment where threads are used to secure the vacuum line 26 to the flow receiving device 24, the corresponding sets of threads may be located on the inside diameter of the vacuum line 26 and the outside diameter of the flow receiving device 24 or, alternatively, on the outside diameter of the vacuum line 26 and the inside diameter of the flow receiving device 24. The vacuum line 26 may be rigid or flexible, and may facilitate movement of at least a portion of the flow receiving device 24 into and/or within the filter housing 31 of the filter 30.

The flow receiving device 24 may be any device capable of delivering a negative pressure in a controlled manner. The flow receiving device 24 may be, for example, a tube, collector, shaft, sheath, or any other like device known in the art. The flow receiving device 24 may be a one-piece device, or may be made of two or more pieces or parts operatively connected to each other. The flow receiving device 24 may be rigid enough to withstand the negative pressure supplied without being more than nominally deformed. The flow receiving device 24 may be composed of, for example, plastic, polyvinyl, steel, copper, aluminum, titanium, or any other material known in the art. The flow receiving device 24 may be, for example, substantially hollow, substantially cylindrical, and/or any other shape useful in controllably delivering a negative pressure. The shape of the flow receiving device 24 may enable insertion through, manipulation within, and removal from the rigid second orifice 56 of the filter 30. The flow receiving device 24 may be sized to deliver an amount of negative pressure useful in assisting in the removal of matter from the filter 30 without causing damage to the filter media 42 or other filter components. The flow receiving device 24 may be adjustably movable into and out of the filter housing 31 such that a user may position the flow receiving device 24 as close to the filter media 42 as is desirable for assisting in matter removal. Thus, the flow receiving device 24 may be manipulated or otherwise positioned to maximize the negative pressure delivered across the filter media 42.

Figure 9:
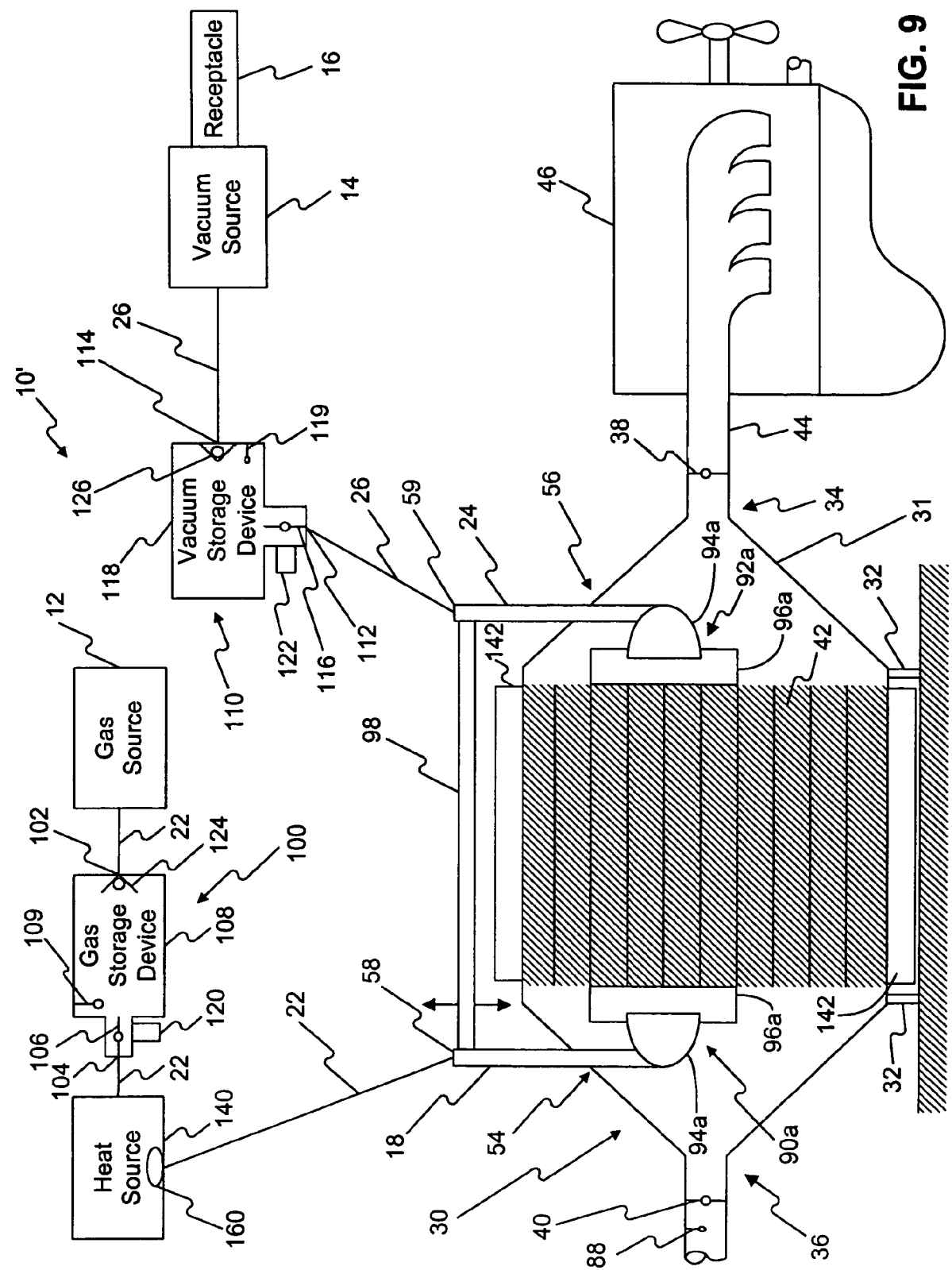
FIG. 9 is a diagrammatic illustration of a service system according to another exemplary embodiment of the present disclosure.

As shown in FIG. 9, the flow distribution device 18 and the flow receiving device 24 of FIG. 1 may take the form of two end effectors 90*a*, 92*a*. The end effectors 90*a*, 92*a* of service system 10' may be any shape, size, and/or configuration to assist in maximizing the distribution of air across the filter media 42. For example, in some embodiments, each end effector 90*a*, 92*a* may be a one-piece device having a hub portion 94*a* and a media interface portion 96*a*. In other embodiments, the end effectors 90*a*, 92*a* may be made of two or more pieces. The hub portion 94*a* of the end effectors 90*a*, 92*a* may be fluidly connected to the gas source 12 and the vacuum source 14, respectively, to facilitate the flow of air and/or matter removed from the filter media 42. This connection may be rigid or flexible, depending on, for example, the configuration of the filter 30. The connection may enable at least a portion of the end effectors 90*a*, 92*a* to mate with at least a portion of a surface of the filter media 42.

The media interface portion 96*a* may be, for example, round, tapered, box-shaped, or any other suitable shape, and may be sized and/or otherwise configured to mate with the filter media 42 without causing damage when a compressed gas or a negative pressure is supplied thereto. The media interface portions 96*a* may be rigid or malleable, or may include at least a component that is rigid or malleable, to facilitate a desirable contact and/or seal with the filter media 42, and may be made of any suitable material or combination of materials known in the art. At least a portion of the media interface portions 96*a* may rotate or be otherwise movable relative to the filter media 42 to alter the distribution of flow across the media 42. The movable portions may be actuated by, for example, a solenoid, an electric motor, or other means (not shown) known in the art.

As shown in FIG. 9, the end effectors 90*a*, 92*a* may be directly aligned with each other on opposite sides of the filter media 42. To facilitate the direct alignment and/or coordinated movement of the end effectors 90*a*, 92*a*, the flow distribution device 18 and the flow receiving device 24 may be connected by, for example, a connector 98. The connector 98 may be, for example, a rod, a bar, a handle, a beam, or other suitable connecting means and may be made from any suitable material known in the art. The end effectors 90*a*, 92*a* may be rigidly mounted to the connector 98 such that each may be manipulated in unison by manipulating the connector 98. Exemplary movement of the connector 98 is illustrated by the arrows in FIG. 9. Manipulating the connector 98 of service system 10' may, thus, cause corresponding movement of the end effectors 90*a*, 92*a*. In some embodiments, the connector 98 may be manipulated manually, while in other embodiments, the connector 98 may be actuated using any conventional actuation means. Such actuation means may include, for example, electric, hydraulic, pneumatic, and/or other controls known in the art.

The filter housing 31 may define suitable orifices 54, 56 to accept the flow distribution device 18 and the flow receiving device 24, respectively. The orifices 54, 56 may be sized and/or shaped to allow for this movement, and a flexible hood (not shown) or other like structure may be used to form a seal between the end effectors 90*a*, 92*a* and the filter housing 31 during operation. The flexible hood may be sealed to the devices 18, 24 and to the filter housing 31 of the filter 30 with adhesives, or by any other suitable means. The flexible hood may be of a type known in the art and may be made of, for example, plastic, rubber, or other suitable materials known in the art. In such an embodiment, at least one of the bosses 20, 21 and/or at least one of the valves 38, 40 may be omitted. It is understood that in some embodiments where end effectors 90*a*, 92*a* are used, the orifices 54, 56 may be relatively large to enable insertion, manipulation, and removal of the end effectors 90*a*, 92*a*. Such large orifices 54, 56 could reduce the efficiency of the system 10 if a proper seal (as explained above) is not formed.

Figure 10:
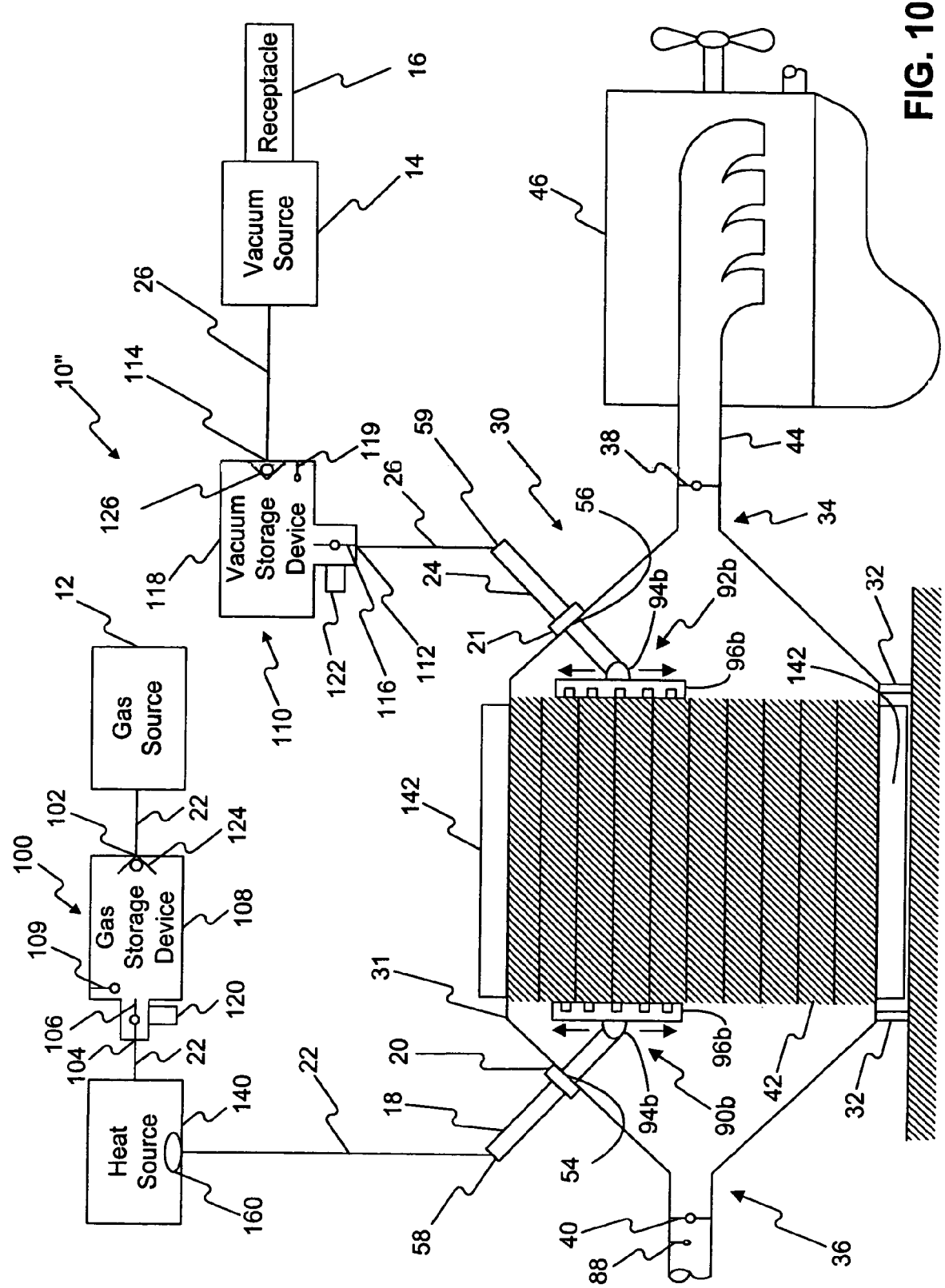
FIG. 10 is a diagrammatic illustration of a service system according to yet another exemplary embodiment of the present disclosure.

In other exemplary embodiments, at least a portion of the end effectors may be, for example, relatively narrow and/or substantially rectangular. For example, as FIG. 10 illustrates, each of the end effectors 90*b*, 92*b* of service system 10" may include a hub portion 94*b* and a media interface portion 96*b* that is substantially narrow and/or substantially rectangular. The end effectors 90*b*, 92*b* may be made of the same or like materials, and may have the same or like mechanical characteristics as the end effectors 90*a*, 92*a* described above with respect to FIG. 9. The media interface portions 96*b*, however, may be narrower and/or have a smaller surface area than the media interface portions 96*a* shown in FIG. 9. As a result, the orifices 54, 56 defined by the filter housing 31 in such embodiments may be smaller than those discussed above with respect to end effectors 90*a*, 92*a*. Such orifices 54, 56 may be sized and shaped to accept the end effectors 90*b*, 92*b*, and may allow the media interface portions 96*b* to access substantially an entire face of the filter media 42. Such orifices 54, 56 may require smaller flexible hoods (not shown) or other like structures to form a seal between the end effectors 90*b*, 92*b* and the filter housing 31 during operation. Alternatively, the flexible hoods may form a seal between the end effectors 90*b*, 92*b* and the bosses 20, 21. The bosses 20, 21 may be sized corresponding to the orifices 54, 56 to allow for relative movement between the end effectors 90*b*, 92*b* and the filter housing 31.

The media interface portions 96*b* may be rotatably connected about the end effectors 90*b*, 92*b* by the hub portions 94*b*. This rotatable connection may enable the end effectors 90*b*, 92*b* to, for example, align for insertion into the filter 30. This connection may be facilitated by any suitable rotatable connecting means known in the art. It is understood that the connection may be a fluid connection as described above. In such embodiments, the end effector 90b and/or the end effector 92b may further include an adjustable stop (not shown) to prevent insertion into the filter 30 beyond a predetermined safe distance. This safe distance may prevent damage to, for example, the filter media 42. In some embodiments, the end effector 92b may be omitted and replaced with the flow receiving device 24 of FIG. 1.

Figure 11:
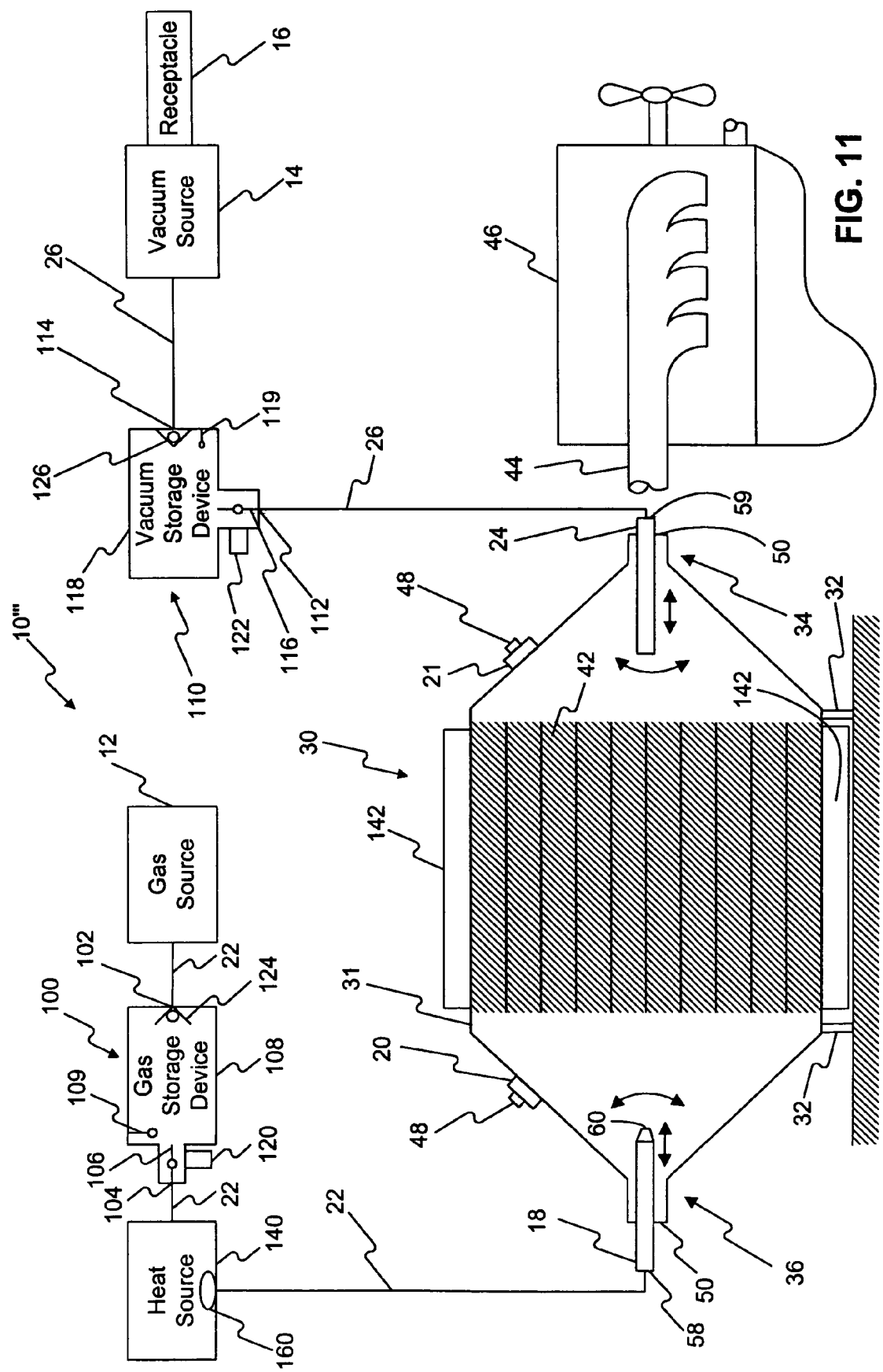
FIG. 11 is a diagrammatic illustration of a service system according to still another exemplary embodiment of the present disclosure.

FIG. 11 illustrates an embodiment of a service system 10''' of the present disclosure in which the flow receiving device 24 and the flow distribution device 18 may be connected in-line with the filter 30. In this embodiment, the inlet 34 of the filter 30 may be disconnected from the exhaust line 44 of the engine 46. The outlet 36 of the filter 30 may also be disconnected from any work machine component to which the outlet 36 may have been attached. The flow receiving device 24 and flow distribution device 18 may then be connected to the inlet 34 and outlet 36, respectively. When so connected, at least a portion of the devices 24, 18 may be within the filter housing 31. Each of the devices 24, 18 may be sealidly connected to the filter 30, and the connection may be substantially airtight. As shown in FIG. 11, fittings 50 may be used to facilitate this connection. The fittings 50 may be any type of fittings known in the art and may provide for a rigid connection between the devices 24, 18 and the filter 30. Alternatively, the fittings 50 may provide for a removably attachable connection in which the devices 24, 18 are movable with respect to the filter media 42 to improve the removal capabilities of the service system 10'''. The fittings 50 may be made of, for example, a heat shrink material, plastic, rubber, steel, tin, copper, aluminum and/or any other material known in the art. In this embodiment, the inlet and outlet valves 38, 40 (not shown) may be omitted.

It is understood that although the filter 30 may be disconnected from the engine 46 and other components of the work machine, the filter 30 is still connected to the work machine by filter brackets 32 or other connection means. Thus, the filter 30 may be serviced without being removed from the work machine. To enable rapid disconnection from the engine 46 and other components of the work machine, the fittings 50 of FIG. 11 may be, for example, flexible couplings, oversized sleeve couplings, or any other conventional couplings capable of facilitating a rapidly detachable connection between two stationary work machine components.

Figure 12:
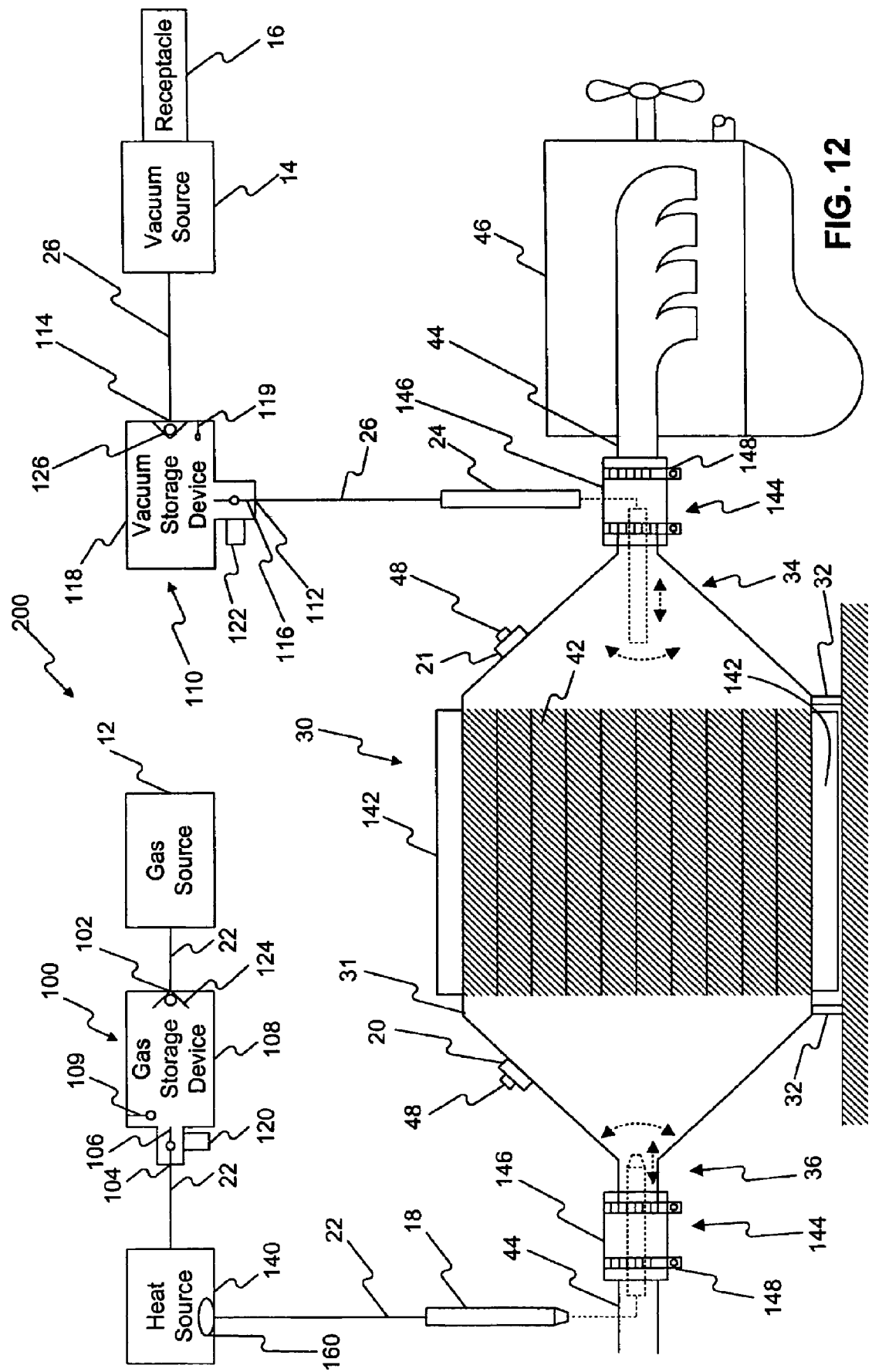
FIG. 12 is a diagrammatic illustration of a service system according to another exemplary embodiment of the present disclosure.

For example, as illustrated in FIG. 12, an access assembly 144 may be coupled to an inlet 34, outlet 36, and/or other orifice 54, 56 of the filter 30. The access assembly 144 may be removably attached to any of the orifices mentioned above. The filter media 42 may be accessed by the service system 200 while the filter 30 is connected to the work machine by, for example, manipulating and/or removing a component of the access assembly 144. As shown in FIG. 12, such a component may include a removable section of piping 146, a capped Y section of piping, a removable diffuser, and a 90 degree section of piping. It is understood that the above components may be substantially rigid or flexible. In addition, the above components may be substantially rigid and may include flexible portions (not shown) to assist in manipulation and/or rapid removal of the component. The flexible portions of these components may also assist in forming a fluid seal between the component and, for example, the exhaust line 44, inlet, 34, outlet, 36, and or other device to which the component is connected. The access assembly 144 may further include one or more clamps 148, removable bands, hinges, flanges, fittings, ties, and/or other conventional connection means to assist in manipulating and/or removing the component of the access assembly 144. Such connection means may also facilitate quick access to the filter media 42 without removing the filter 30 from the work machine.

In another exemplary embodiment, the inlet 34 and/or outlet 36 of the filter 30 may be on a side of the filter 30. In such embodiments, a removable elbow or 90 degree section of piping (not shown) may be used at the inlet 34 and/or outlet 36 of the filter 30 to facilitate a rapidly detachable connection between, for example, the filter 30 and another component of the work machine exhaust system. The 90 degree sections may be configured to rotate to allow access to the filter media 42 while the 90 degree sections are connected to the filter 30. Any of the fittings 50 or other connection means mentioned above may be used to facilitate the connection and/or removal of the 90 degree sections from the filter 30.

Figure 13:
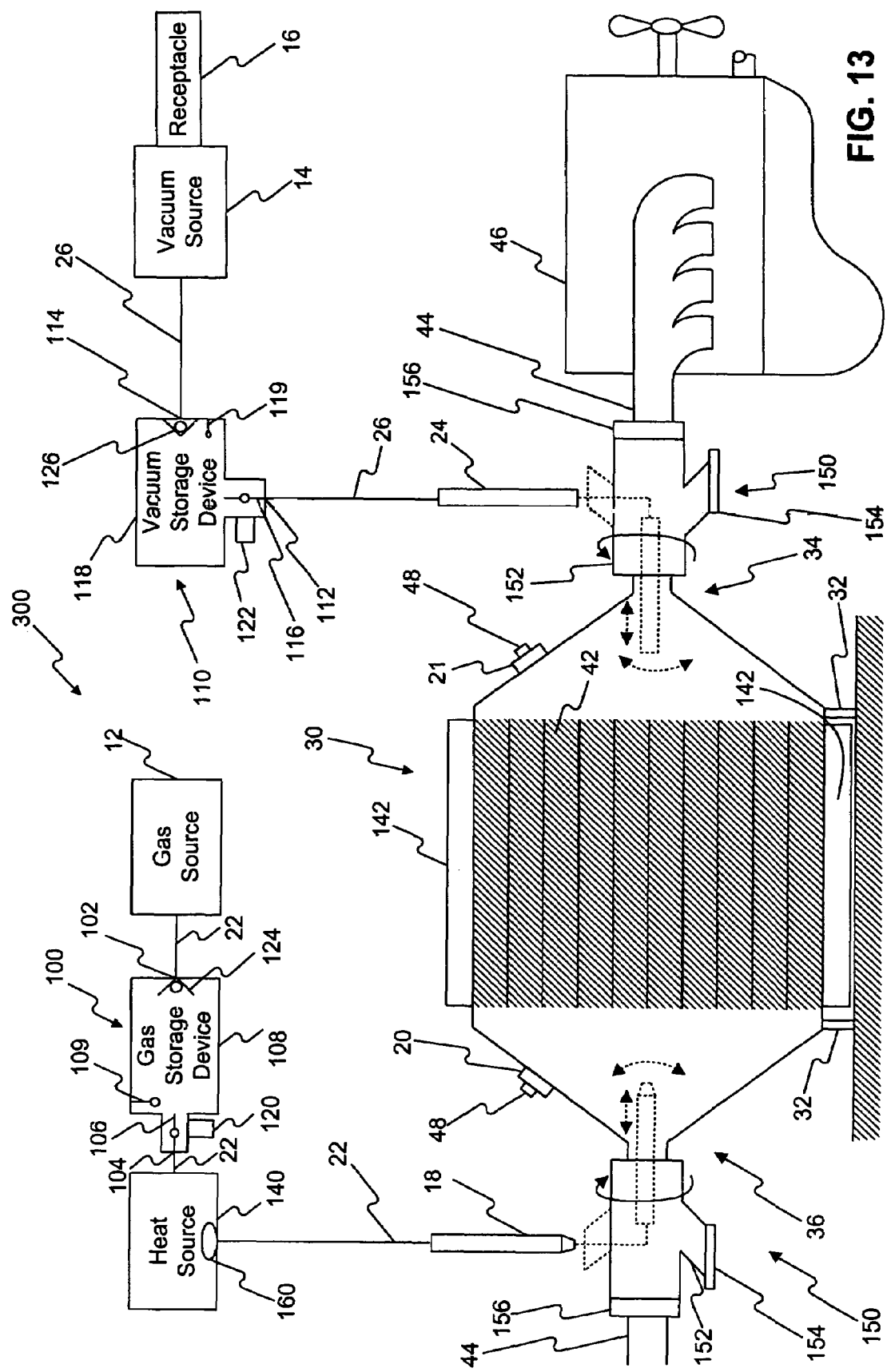
FIG. 13 is a diagrammatic illustration of a service system according to yet another exemplary embodiment of the present disclosure.

FIG. 13 illustrates an additional exemplary embodiment of an access assembly 150 including a capped Y section 152, a valve 156, and a cap 154. It is understood that the valve 156 of the access assembly 150 may be any type of flow valve known in the art such as, for example, a quick release valve, a two-way valve, a three-way valve, and a rotatable valve. It is understood that a rotatable valve may be opened and/or closed by, for example, rotating the capped Y section 152 or other component to which the rotatable valve is connected. The cap 154 may be a threaded cap or other type of cap known in the art. The cap 154 may fluidly seal an orifice of the capped Y section 152 during operation of the filter 30 and may be removed to permit components of the service system 300 to gain access to the filter media 42 during servicing.

Figure 14:
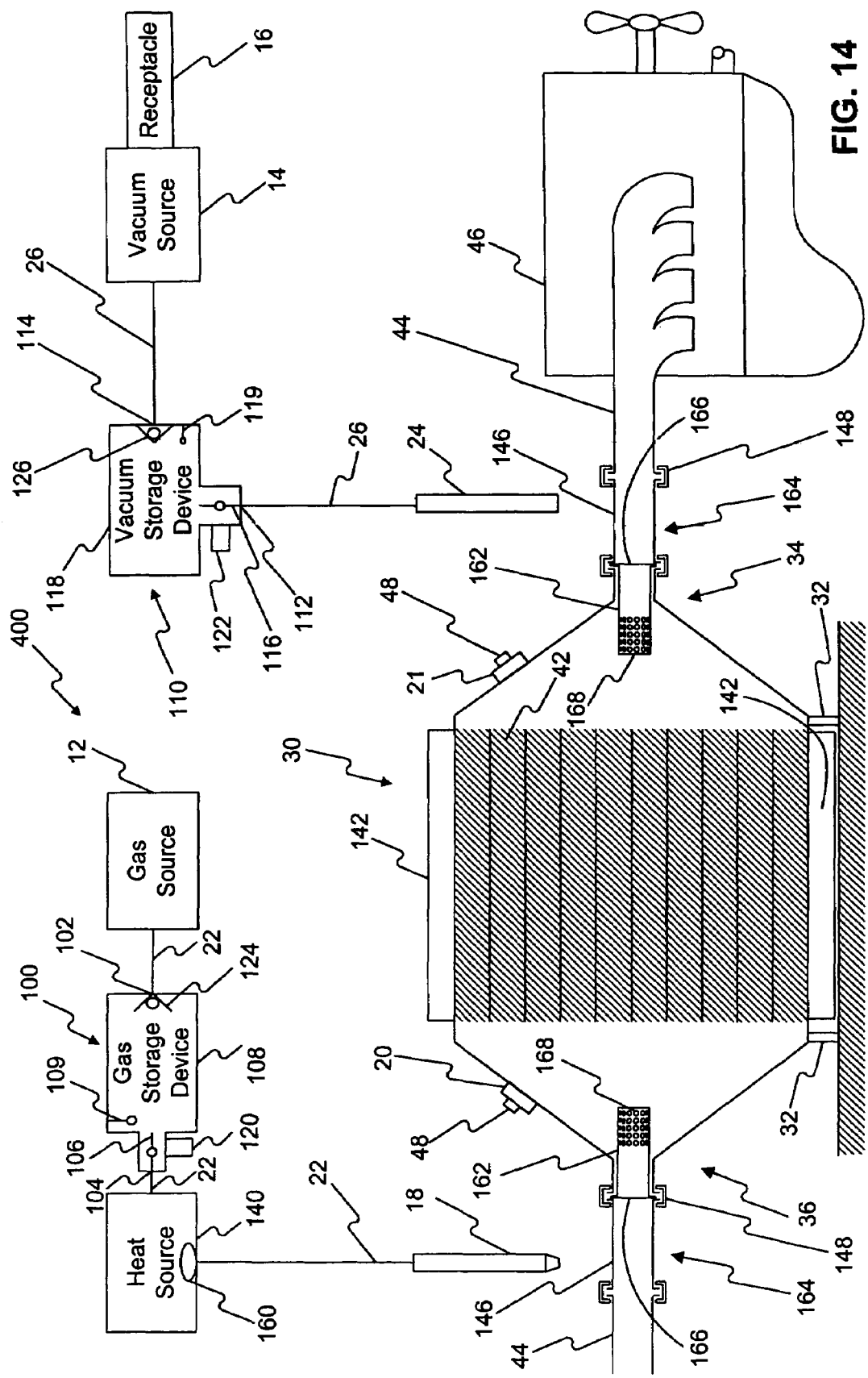
FIG. 14 is a diagrammatic illustration of a service system according to still another exemplary embodiment of the present disclosure.

FIG. 14 illustrates yet another exemplary embodiment of an access assembly 164 of the present disclosure including a baffle 162, a removable piping section 146, and one or more clamps 148. The baffle 162 may be made of any material known in the art, such as, for example, steel, aluminum, titanium, and/or alloys thereof. Such materials may be capable of withstanding exhaust flows and regeneration temperatures in the ranges discussed above. The baffle 162 may be substantially hollow, substantially cylindrical, and/or any other shape known in the art to assist in distributing exhaust gas across substantially an entire surface of the filter media 42 during normal operation of the engine 46. Such a shape may assist in inserting and/or removing the baffle 162 within the inlet 34 and/or the outlet 36 of the filter 30 and may improve the flow distribution capabilities of the baffle 162. As shown in FIG. 14, the baffle 162 may include, for example, orifices 168 disposed about a portion of its perimeter. The orifice 168 may assist in desirably distributing the flow of exhaust gas during operation of the engine 46. Alternatively, the baffle 162 may include other structures known in the art (not shown), such as, for example, fins, legs, or flow channels to assist in the distribution of flow. It is understood that although FIG. 14 shows a baffle 162 mounted at both the inlet 34 and the outlet 36 of the filter 30, in an exemplary embodiment, the baffle 162 mounted at the outlet 36 may be omitted.

The removable piping section 146 and the clamps 148 shown in FIG. 14 may be substantially the same as those described above with respect to FIG. 12. Thus, the removable piping section 146 and/or the clamps 148 may assist in manipulating and/or rapidly removing, for example, the baffle 162. The removable piping section 146 and/or the clamps 148 may also facilitate quick access to the filter media 42 without removing the filter 30 from the work machine. Removal of the baffle 162 may enable the insertion of, for example, a portion of the flow distribution device 18 and/or flow receiving device 24 described above into the filter 30 for servicing. Flexible portions (not shown) of the baffle 162 and/or the removable piping section 146 may also assist in forming a fluid seal between components of the access assembly 164 and, for example, the exhaust line 44, inlet, 34, outlet, 36, and/or other devices to which the components of the access assembly 164 are connected. A flange 166 of the baffle 162 may extend perpendicular to a longitudinal axis of the baffle 162 and may assist in connecting the baffle 162 to other components of the access assembly 164 and/or forming the fluid seal discussed above.

Referring again to FIG. 11, the bosses 20, 21 described above with respect to any of FIGS. 1 or 10-14 may be sealed with the use of boss caps 48 of a type known in the art. The boss caps 48 may be, for example, threaded or nonthreaded plugs, bolts, or rubber stoppers, and may seal the bosses 20, 21 when the flow distribution device 18 and the flow receiving device 24, respectively, are not connected to the filter housing 31 in the manner illustrated in FIGS. 1 and 10. By sealing the bosses 20, 21, the boss caps 48 may substantially prohibit a gas or matter from entering or exiting the filter 30 while the filter is being serviced. The boss caps 48 may be sized to sealingly fit the inside diameter of the bosses 20, 21, or may be sized to sealingly fit over the outside of the bosses 20, 21. Alternatively, in embodiments such as the embodiment illustrated in FIG. 9, the bosses 20, 21 may be omitted.

In such an embodiment, the vacuum source 14 may be fluidly connected to the vacuum storage device outlet 114 and the vacuum storage device inlet 112 may be fluidly connected to the flow receiving device outlet 59. Similarly, the gas source 12 may be fluidly connected to the gas storage device inlet 102, the gas storage device outlet 104 may be connected to the heat source 140, and the heat source 140 may be connected to the flow distribution device 18.

As shown in FIG. 1, in an exemplary embodiment of the present disclosure, the service system 10 may further include a vibration device 142. The vibration device 142 may be, for example, a mechanical, magnetic, hydraulic, acoustic, electric, pneumatic, or other device known in the art capable of rapidly actuating or vibrating an object to which it is attached or to which it is in close proximity. The vibration device 142 may be removably attachable to the filter housing 31 through conventional means and may be configured to extend at least partially around the circumference or outer perimeter of the filter housing 31. For example, as shown in the exemplary embodiment of FIG. 1, a vibration device 142 may have a substantially cylindrical or substantially ring-shaped configuration and may extend substantially completely around the filter housing 31. In another exemplary embodiment, the vibration device 142 may comprise two or more separate components attached to the filter 30. It is understood that the vibration device 142 may be connected to the filter 30 at locations where vibration may assist in removing matter from, for example, the filter media 42. In an exemplary embodiment, the vibration device 142 may be disposed on the filter housing 31 so as to extend along substantially an entire length of the filter media 42. In such an embodiment, the vibration device 142 may be, for example, a gyroscopic gear device extending longitudinally along the filter housing 31.

The vibration device 142 may be electrically connected to a controller (not shown) or other control device known in the art capable of, for example, turning the vibration device 142 on and off, and/or controlling the frequency of vibration transmitted by the vibration device 142. It is understood that the vibration device 142 may also be manually controlled. The vibration device 142 may be capable of transmitting any frequency of vibration to the filter 30 useful in removing matter from the filter 30.

As described above, the filter brackets 32 may be configured to secure the filter 30 to the work machine while allowing at least a portion of the filter 30 to vibrate in response to actuation by the vibration device 142. It is understood that these filter brackets 32 may at least partially dampen vibration transmitted by the vibration device 142. The vibration device 142 and/or the filter brackets 32 may, however, be tuned or otherwise selected to reduce this dampening such that actuation by the vibration device 142 may assist in removing matter from the filter 30 while the filter 30 is attached to the work machine. In an additional exemplary embodiment, the filter brackets 32 may be desirably loosened to decrease dampening. Alternatively, the vibration device 142 may be connected to the filter 30 after the filter 30 has been removed from the work machine for servicing.

INDUSTRIAL APPLICABILITY

The disclosed service system 10 may be used with any filter 30, filtering device, or other matter collection device known in the art. Such devices may be used in any application where the removal of matter is desired. For example, such devices may be used on diesel, gasoline, natural gas, or other combustion engines or furnaces known in the art. Thus, as discussed above, the disclosed service system 10 may be used in conjunction with any work machine, on-road vehicle, off-road vehicle, stationary machine, and/or other exhaust-producing machines to remove matter from a filtering device thereon.

The service system 10 may be used to remove matter from a filter 30 in configurations where the filter 30 remains mounted to the work machine during servicing and in configurations where the filter 30 is removed from the work machine during servicing. In an exemplary embodiment in which the filter 30 remains mounted to the work machine during servicing, the service system 10 may be mounted directly to the work machine during operation of the work machine and may be removably attachable to the filter 30. For example, the system 10 could be fixedly secured within a compartment of the work machine, such as the engine compartment. In another exemplary embodiment in which the filter 30 remains mounted to the work machine during servicing, the service system 10 may not be mounted to the work machine during operation and may be removably attached to the filter 30 for servicing via the bosses 20, 21 (FIG. 1), fittings 50 (FIG. 11), removable piping 146, 90 degree sections, and/or other connection means described above. It is understood that in exemplary embodiments in which the filter 30 is removed from the work machine during servicing, components of the service system 10 may be separate from the work machine during operation of the work machine and may be removably attached to the filter 30.

A variety of different methods and systems may be used to remove matter from the filtering devices of the machines described above. For example, some filters used in such machines may be cleaned through regeneration. During regeneration, a heater or some other heat source may be used to increase the temperature of the filter components. The heater may also increase the temperature of trapped particulate matter above its combustion temperature, thereby burning away the collected particulate matter and regenerating the filter while leaving behind a small amount of ash. Although regeneration may reduce the buildup of particulate matter in the filter, repeated regeneration of the filter may result in a buildup of ash in the components of the filter over time and a corresponding deterioration in filter performance.

Unlike particulate matter, ash cannot be burned away through regeneration. Thus, in some situations, it may be necessary to remove built-up ash from an engine filter using other techniques and systems. The operation of the service systems 10, 10', 10", 10"', 200, 300 described above will now be explained in detail. Unless otherwise specified, reference will be made to the components illustrated in FIG. 1 for the duration of this application.

During a normal operating condition of the engine 46, the service system 10 may not be connected to the filter 30, and the inlet valve 38 and outlet valve 40 may both be open to facilitate passage of an exhaust flow from the engine 46. The exhaust flow may exit the engine 46, and pass through the exhaust line 44 and open inlet valve 38. The exhaust flow may enter the filter 30 through the inlet 34 and may travel across at least a portion of the filter media 42. The filter media 42 may assist in removing, for example, pollutants, such as particulate matter, present in the exhaust flow. Upon exiting the filter 30 via the outlet 36, the exhaust flow may pass through open outlet valve 40.

Over time, the work machine diagnostic devices 88 may sense an increase in the amount of pollutants being released to the atmosphere. Based on these readings, the filter 30 may undergo regeneration either automatically or as a result of some operator input. As described above, after a number of regeneration cycles, ash may begin to build up in the filter media 42. It is understood that soot may also be present within the filter 30 after a regeneration cycle as a result of, for example, incomplete regeneration and/or filter use after regeneration. The service system 10 of the present disclosure may be attached to the filter 30 to assist in removing the ash, soot, and/or other matter collected therein.

To begin the removal of matter from the filter 30, the engine 46 may be turned off such that combustion ceases and there is no exhaust flow from the engine 46 to the exhaust line 44. The inlet and outlet valves 38,40 may be manually closed by the user. Alternatively, in an embodiment where the valves 38, 40 may be actuated by a solenoid or other means, the valves 38, 40 may be controlled to close remotely. Closing inlet valve 38 may protect components of the engine 46 during the matter removal process and may prevent, for example, ash from entering the engine 46 through exhaust line 44. Closing outlet valve 40 while inlet valve 38 is closed may prevent gas from escaping the filter 30 after being supplied by the flow distribution device 18.

The gas source 12 may be attached to the filter 30 by removing the boss cap 48 (FIG. 11) and inserting the flow distribution device 18 into the filter housing 31 via boss 20. The flow distribution device 18 may be positioned to maximize the flow of compressed air or other gas across the filter media 42 without damaging the filter media 42. Damage to the filter media 42 may be prevented by an adjustable stop (not shown) attached to the flow distribution device 18.

The vacuum source 14 may be attached to the filter 30 by removing the boss cap 48 (FIG. 11) on an opposite side of the filter 30 and inserting a flow receiving device 24 into the filter housing 31 via boss 21. The flow receiving device 24 may be inserted into the filter 30 and may be positioned to maximize the amount of vacuum or negative pressure supplied to the filter media 42 without damaging the filter media 42. Alternatively, as illustrated in FIG. 11, the filter media 42 may also be accessed through the inlet 34 and outlet 36 of the filter 30 via any of the fittings 50, removable piping, 90 degree sections, and/or other connection means described above.

The gas source 12 may be activated and may begin to supply compressed air to the filter 30. The gas storage device valve 106 may be in an open position to allow compressed air to pass through the gas storage device 100 substantially unrestricted. Once the gas source 12 has been activated, the heat source 140 may also be activated to increase the temperature of the compressed air before it enters the filter 30. It is understood that the heat source 140 may be desirably activated at any time during servicing.

The flow of heated compressed air may pass to the flow distribution device 18 via gas line 22, and the flow distribution device 18 may direct the flow to obtain maximum air distribution across the filter media 42. This distribution of heated compressed air may be the result of the design of the flow distribution device 18, such as the hole pattern, manual or mechanical actuation, free movement, or a combination thereof. It is understood that while compressed air is being supplied by the gas source 12, the flow distribution device 18 may be manipulated by the user to direct the distribution of heated compressed air within the filter 30 and to improve the system's matter removal capabilities. For example, the devices 18, 24 of FIG. 9 may be manipulated substantially up and down along the filter media 42, as shown by the directional arrows. The devices 18, 24 of FIG. 10 may be manipulated in substantially the same manner. As illustrated in FIGS. 1, 9, 10, and 11, such manipulation may depend in part on the types of devices 18, 24 and/or end effectors 90a, 92a, 90b, 92b utilized. While the devices 18, 24 of FIGS. 1 and 11 may be manipulated in virtually any direction to improve the distribution of air, the devices 18, 24 of FIGS. 9 and 10 may be partially limited in their range of motion due to at least the size and shape of the end effectors 90a, 92a and 90b, 92b, respectively.

Supplying a flow of heated compressed air across the filter media 42 in this reverse flow direction may assist in removing a portion of the ash contained therein. The flow of heated air may also assist in drying a portion of the soot contained within the filter 30. For example, the heat source 140 may heat the compressed air to approximately 200 degrees Celsius (392 degrees Fahrenheit) or some other temperature below the soot regeneration temperature. Such temperatures may sufficiently dry soot trapped within the filter media 42 by evaporating hydrocarbons, such as, for example, unburnt fuel or lubricant oil such that the soot may be removed without regeneration. These temperatures may be below soot combustion temperatures. Thus, drying the soot in this way may reduce the risk of damage to the filter 30 or its components caused by, for example, soot combustion at higher temperatures.

In addition, drying soot at the temperatures discussed above may take far less time than conventional regeneration processes. For example, in an embodiment of the present disclosure, soot contained within the filter 30 may be dried by operating the gas source 12 and the heat source 140 for less than approximately 2 hours, depending on, for example, the size of the filter 30, the configuration and material composition of the filter media 42, and the type of heat source 140 used. Soot drying times may also depend on the amount of soot contained within the filter 30. Soot content of the filter may be determined using, for example, any of the work machine diagnostic devices 88 discussed above. Such reduced service times may be advantageous in many work machine environments.

The vacuum source 14 may be activated at substantially the same time as the gas source 12 and may supply a vacuum or negative pressure to the filter 30 while the gas source 12 and the heat source 140 supply the flow of heated compressed air. The gas source 12 and the vacuum source 14 may force air through the filter 30 in a direction opposite the direction of exhaust flow during normal filter operating conditions. The combination of compressed air and vacuum may improve the matter removal capabilities of the service system 10 and may be useful in removing ash lodged deep within the filter media 42 of the filter 30. It is understood that the heat source 140 may be operated in conjunction with the vacuum source 14 and/or the gas source 12 to assist in removing matter from the filter 30.

In some embodiments, the volume of heated compressed air supplied by the gas source 12 and the heat source 140 may substantially coincide with the volume of gas removed by the vacuum source 14. In other embodiments, however, the output of at least the gas source 12 may not be related to the input of the vacuum source 14. It is understood that in embodiments where the input of the vacuum source 14 and the output of the gas source 12 are not calibrated to be substantially equivalent, the overall efficiency of the service system 10 may not be maximized. It is also understood that in an exemplary embodiment of the present disclosure, the vacuum source 14 may be omitted. In such embodiments, a receptacle 16 may be fluidly connected to the flow receiving device 24 to capture matter removed from the filter 30. Matter removed from the filter 30 may be safely stored in the receptacle 16 during servicing and may reside in the receptacle 16 until disposed of.

It is understood that based on the size, shape, and/or location of the flow receiving device 24, the device may not be capable of collecting all of the matter removed from the filter 30. For example, due to the reverse flow created within the filter, some of the removed ash may relocate adjacent to the flow receiving device 24. Regardless of the flow receiving device's movablility within the filter housing 31, the flow receiving device 24 may not be capable of reaching such removed ash. It is also understood that in order to alleviate this problem, the size of the second orifice 56 may be increased to allow for improved movability. In addition, a larger or funnel-shaped flow receiving device 24 may be used. Each of these solutions, however, may result in other undesirable inefficiencies.

With continued reference to FIG. 1, the user may determine whether the soot contained within the filter 30 has been substantially dried by using, for example, the work machine diagnostic devices 88 described above and/or known filter algorithms useful in predicting the drying time of soot in a filter based on filter type, filter mass, previous regeneration schedule, measured particulate content of an exhaust flow, type of heat source 140 used, and other factors. Once soot contained within the filter 30 has been substantially dried, the heat source 140 may be deactivated and the gas storage device valve 106 may be closed. Closing the gas storage device valve 106 may substantially completely restrict the flow of compressed air from passing to the flow distribution device 18 and may allow for at least a portion of the flow of compressed air to be stored within the gas storage device 100. Pressure may increase within the gas storage device 100 as the portion of the flow is stored therein. The check valve 124 may prevent pressurized gas from exiting through the gas storage device inlet 102 and may, thus, assist in storing gas at a positive pressure. Once a desired positive pressure within the gas storage device 100 has been reached, the gas storage device valve 106 may be opened and the stored gas may be released through the gas storage device outlet 104. The stored gas may pass through the deactivated heat source 140 and through the gas line 22 to the flow distribution device 18. The gas storage device valve 106 may be opened rapidly to maximize the force with which the stored air is released from the gas storage device 100. The released gas may create a shockwave of compressed gas across the filter media 42 and may improve the matter removal capabilities of the service system 10. For instance, a shockwave of gas may be capable of removing matter deep within the filter media 42 in less time and with less effort than a system where a shockwave is not utilized. As described above, the stored flow of gas may be supplied in a direction opposite from the direction of normal flow through the filtering device 30. It is understood that the vacuum source 14 of service system 10 may be operating when the gas storage device valve 106 is opened.

In an embodiment where the service system 10 includes a vacuum storage device 110, the vacuum storage device valve 116 may be closed while the vacuum source 14 is activated. Closing the vacuum storage device valve 116 may substantially completely restrict the flow of air from passing to the vacuum storage device 110 from the filter 30 and may allow a negative pressure to build up within the vacuum storage device 110. Pressure may decrease within the vacuum storage device 110 as flow is restricted by the vacuum storage device valve 116 and the vacuum source continues to pull a vacuum. The check valve 126 may prevent gas from entering the vacuum storage device outlet 114 and may, thus, assist in storing gas at a negative pressure. Once a desired negative pressure within the vacuum storage device 110 has been reached, the vacuum storage device valve 116 may be opened and the built-up negative pressure within the vacuum storage device 110 may rapidly draw a flow of gas from the filter 30 through the flow receiving device 24. The vacuum storage device valve 116 may be opened rapidly to maximize the force with which gas is drawn into the vacuum storage device 110. The use of a vacuum storage device 110 to build up and release a negative pressure downstream of the filter media 42 may improve the matter removal capabilities of the system 10. For instance, rapidly releasing a built-up vacuum may assist in removing matter deep within the filter media 42 in less time and with less effort than a system where a buildup of negative pressure does not exist. As explained above, the negative pressure may be supplied to at least a portion of the filtering device 30 in a direction opposite from the direction of normal flow through the filtering device 30.

It is understood that the gas source 12 may be operating while the vacuum storage device valve 116 is opened. It is also understood that wherein the service system 10 includes both a gas storage device 100 and a vacuum storage device 110, the vacuum storage device valve 116 and the gas storage device valve 106 may be closed while the vacuum source 14 and the gas source 12 are activated, respectively. As described above, closing the valves 116, 106 in this way may restrict flow of air from passing to the vacuum storage device 110 and to the flow distribution device 18. Closing the valves 116, 106 may also allow a negative pressure to build up within the vacuum storage device 110 and a positive pressure to build up in the gas storage device 100. Once desired pressures within the vacuum storage device 110 and the gas storage device 100 have been reached, the valves 116, 106 may be opened. As described above, opening the vacuum storage device valve 116 may rapidly draw a flow of gas from the filter 30 through the flow receiving device 24. Similarly, opening the gas storage device valve 106 may release stored gas to the flow distribution device 18. The valves 116, 106 may be opened rapidly and may be opened substantially in unison to improve the matter removal capabilities of the service system 10.

The vibration device 142 may be connected to the filter 30 without removing the filter 30 from the work machine to which it is attached. The vibration device 142 may be activated before stored gas is released from the gas storage device 100. Alternatively, the vibration device 142 may be activated at any time during servicing of the filter 30 so as to assist in removing matter therefrom. It is understood that using the vibration device 142 to shake or otherwise actuate the filter 30 may assist in, for example, dislodging matter trapped deep within the filter media 42.

The user may determine whether the filter 30 is substantially free of ash by using existing work machine diagnostic devices 88, or other means known in the art. For example, after forcing a reversed flow of compressed air through the filter 30, the user may disconnect the service system 10, open the inlet and outlet valves, 38, 40, and start the engine 46. Work machine diagnostic devices 88 downstream of the filter 30 may determine whether the filter 30 is operating under substantially ash-free conditions or whether the filter 30 requires further service.

In some situations, a substantial portion of ash may remain within the filter 30 after, for example, the gas source 12 and the vacuum source 14 have acted on the filter media 42 in a reverse flow condition. In such situations, it may be necessary to utilize the gas source 12 and the vacuum source 14 to force air through the filter 30 in a normal flow direction. After this normal flow direction cleaning cycle, the user may again disconnect the service system 10 from the filter 30 and measure the performance of the filter 30 using one or more of the work machine diagnostic devices 88 discussed above. This process may be repeated until filter performance returns to satisfactory levels.

Moreover, as illustrated in the exemplary embodiment of FIG. 12, a removable section of piping 146 may be coupled to the inlet 34 and/or outlet 36 of the filter 30. One or more clamps 148 may be used to facilitate the manipulation and/or removal of the removable section of piping 146. The clamps 148 may be loosened by turning a screw, hex nut, or other conventional loosening means. Once the clamps 148 are loosened and/or removed, the removable section of piping 146 may be manipulated and/or removed and the filter media 42 may be accessed. As shown in phantom in FIG. 12, the flow receiving device 24 of service system 200 may be inserted through the inlet 34 and the flow distribution device 18 may be inserted through the outlet 36. As illustrated by the phantom arrows in FIG. 12, the devices 24, 18 may be manipulated as desired to assist in removing matter from the filter 30. Fittings 50 (not shown) may also be used to assist in, for example, sealing the inlet 34 and outlet 36 of the filter 30 when the devices 24, 18 are so inserted.

In addition, as shown in FIG. 13, the filter media 42 may be accessed by rotating the capped Y section 152 in the direction of arrows 158. Such rotation may close valve 156 such that gas may not pass from the capped Y section 152 to the exhaust line 44 at either the inlet 34 or the outlet 36. Cap 154 may then be removed from the capped Y section 152. As described above with respect to FIG. 12, the flow receiving device 24 of service system 300 may be inserted through the inlet 34 and the flow distribution device 18 may be inserted through the outlet 36. As illustrated by the phantom arrows in FIG. 13, the devices 24, 18 may be manipulated as desired to assist in removing matter from the filter 30. Fittings 50 (not shown) may also be used to assist in, for example, sealing the inlet 34 and outlet 36 of the filter 30 when the devices 24, 18 are so inserted. Moreover, as shown in FIG. 14, the filter media 42 may also be accessed by loosening and/or removing clamps 148, and removing removable piping section 146 and baffle 162. Removing, for example, the baffle 162 facilitates the insertion of components of service system 400 into the filter 30, thereby assisting in the removal of matter from the filter 30.

It is understood that in each of the above embodiments, components of the service systems 10, 10', 10", 10'", 200, 300, 400 may be manually inserted into the filter housing 31 during servicing. It is further understood that components of the service systems 10, 10', 10", 10'", 200, 300, 400 may be inserted into the filter housing 31 and/or controlled by electric, pneumatic, hydraulic, and/or other conventional means.

Other embodiments of the disclosed service systems 10, 10', 10", 10'", 200, 300, 400 will be apparent to those skilled in the art from consideration of the specification. For example, the filter 30 may be fitted with more than two bosses 20, 21 to facilitate insertion of more than one flow distribution device 18 and/or more than one flow receiving device 24. Furthermore, the gas source 12 and the vacuum source 14 may be the same device.

Moreover, the service systems 10, 10', 10", 10'", 200, 300, 400 may include at least one sensor for sensing a characteristic of a flow through the filter 30. The sensor may be connected to a service system controller. The controller may control aspects of the ash removal process in response to signals received from the at least one sensor. To facilitate this control, the inlet and outlet valves 38, 40, the gas source 12, and/or the vacuum source 14 may be controllably connected to the controller. It is intended that the specification and examples be considered as exemplary only, with the true scope of the invention being indicated by the following claims.

What is claimed is:

1. A method of removing matter from a filtering device of a machine, comprising:
   connecting a gas pressurization assembly to a first orifice of the filtering device;
   increasing the temperature of a flow of compressed gas supplied by the gas pressurization assembly; and
   directing the flow of heated compressed gas to at least a portion of the filtering device without regenerating the filtering device.

2. The method of claim 1, wherein the temperature of the flow of compressed gas supplied by the gas pressurization assembly is increased up to at least approximately 200 degrees Celsius.

3. The method of claim 1, further including providing a heat source to assist in increasing the temperature of the flow of compressed gas.

4. The method of claim 1, wherein the increasing of the temperature serves to dry soot contained within the at least a portion of the filtering device.

5. The method of claim 4, wherein drying soot takes less than approximately two hours.

6. The method of claim 1, further including supplying a negative pressure to at least a portion of the filtering device with a vacuum source.

7. The method of claim 6, further including controllably fluidly coupling a vacuum storage device to the filtering device so as to enable a gas to flow from the filtering device to the vacuum storage device.

8. The method of claim 6, further including controllably fluidly coupling a gas storage device to the filtering device so as to release the stored gas from the gas storage device.

9. The method of claim 6, further including connecting a vibration device to the filtering device while the filtering device is connected to the machine.

10. The method of claim 9, wherein the vibration device is configured to shake the filtering device and thereby assist in removing matter from the filtering device.

11. A method of removing matter from a filtering device of a machine, comprising:
   manipulating a component of an access assembly coupled to an orifice of the filtering device, the access assembly being removably attached to the orifice, the orifice including at least one of an inlet and an outlet of the filtering device through which a flow of exhaust passes;

fluidly connecting a service system to the orifice; and providing a flow of compressed gas from the service system to the filtering device.

12. The method of claim 11, wherein manipulating the component of the access assembly includes removing the component from the filtering device and the fluidly connecting includes coupling a flow distribution device of the service system to the orifice.

13. The method of claim 11, wherein manipulating the component of the access assembly includes rotating the component relative to the filtering device and the fluidly connecting includes coupling a flow distribution device of the service system to the orifice.

14. The method of claim 11, wherein the component of the access assembly is one of a removable piping section, a capped Y section of piping, a baffle, and a 90 degree section.

15. The method of claim 11, wherein the access assembly further includes at least one of a flange, a fitting, a clamp, and a valve.

16. A system for removing matter from a filtering device of a machine, comprising:

a gas pressurization assembly including a gas storage device coupled to a gas source, an element of the gas pressurization assembly being removably attachable to a first orifice of the filtering device without removing the filtering device from the machine to which the filtering device is connected; and a heat source fluidly connected to the gas pressurization assembly.

17. The system of claim 16, wherein the system is removably attached to the filtering device and is configured to remove matter from the filtering device while the filtering device is connected to the machine.

18. The system of claim 16, wherein the gas source includes a compressor.

19. The system of claim 16, wherein a flow of fluid from the gas storage device is controllably fluidly connectable to the filtering device.

20. The system of claim 19, wherein the gas storage device includes a high pressure gas tank.

21. The system of claim 16, further including a vacuum source fluidly connected to the filtering device.

22. The system of claim 21, wherein the vacuum source includes a vacuum pump.

23. The system of claim 21, further including a vacuum storage device coupled to the vacuum source, the vacuum storage device being controllably fluidly connectable to the filtering device.

24. The system of claim 23, wherein the vacuum storage device includes a gas tank capable of storing a gas at a negative pressure.

25. The system of claim 21, further including a vacuum storage device coupled to the vacuum source, the gas storage device being controllably fluidly connectable to the filtering device and the vacuum storage device being controllably fluidly connectable to the filtering device.

26. The system of claim 16, wherein the heat source includes one of a burner, an electric heating coil, a compressed air heating element, a forced air heating element, and a microwave heating element.

27. The system of claim 16, wherein the heat source is configured to raise a temperature of pressurized gas supplied to the filtering device sufficient to dry soot contained within the filtering device.

28. The system of claim 16, wherein the heat source is configured to increase the temperature of a flow of compressed gas generated by the gas pressurization assembly up to at least approximately 200 degrees Celsius.

29. The system of claim 16, further including a vibration device removably attachable to the filtering device without removing the filtering device from the machine.

30. The system of claim 29, wherein the vibration device extends along substantially an entire length of a filter media of the filtering device.

31. The system of claim 29, wherein the vibration device includes two or more separate components removably attached to the filtering device.

32. The system of claim 16, wherein the filtering device is a particulate filter for an internal combustion engine.

33. A system for removing matter from a filtering device of a machine, comprising:

a gas pressurization assembly, an element of the gas pressurization assembly being removably attachable to a first orifice of the filtering device;

a heat source fluidly connected to the gas pressurization assembly; and a vibration device removably attachable to the filtering device.

34. The system of claim 33, wherein the vibration device is a gyroscopic gear-type device.

35. The system of claim 33, wherein the vibration device is substantially ring-shaped.

36. The system of claim 33, wherein the system is removably attached to the filtering device and is configured to remove matter from the filtering device while the filtering device is connected to the machine.

37. The system of claim 33, further including a vacuum source fluidly connected to the filtering device.

38. The system of claim 33, wherein the heat source includes one of a burner, an electric heating coil, a compressed air heating element, a forced air heating element, and a microwave heating element.

39. The system of claim 33, wherein the gas pressurization assembly includes a gas source fluidly connected to the filtering device; and the heat source is configured to increase the temperature of a flow of compressed gas generated by the gas source up to at least approximately 200 degrees Celsius.

40. The system of claim 33, wherein the heat source is configured to raise a temperature of pressurized gas supplied to the filtering device sufficient to dry soot contained within the filtering device.

41. The system of claim 33, wherein the vibration device includes two or more separate components removably attached to the filtering device.

42. The system of claim 33, wherein the vibration device extends along substantially an entire length of a filter media of the filtering device.

43. The system of claim 33, wherein:

the element of the gas pressurization assembly is removably attachable to the first orifice of the filtering device without removing the filtering device from the machine to which the filtering device is connected; and the vibration device is removably attachable to the filtering device without removing the filtering device from the machine.

* * * * *